US011929575B2

(12) United States Patent
Fan et al.

(10) Patent No.: US 11,929,575 B2
(45) Date of Patent: Mar. 12, 2024

(54) COPLANAR CARD EDGE CONNECTOR

(71) Applicant: Amphenol Commercial Products (Chengdu) Co., Ltd., Chengdu (CN)

(72) Inventors: Jun Fan, Chengdu (CN); Tao Zeng, Chengdu (CN); Ki Ka Lau, Kowloon (HK)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 13 days.

(21) Appl. No.: 17/706,404

(22) Filed: Mar. 28, 2022

(65) Prior Publication Data

US 2022/0320784 A1 Oct. 6, 2022

(30) Foreign Application Priority Data

Mar. 30, 2021 (CN) ......................... 202120642789.6

(51) Int. Cl.

*H01R 13/502* (2006.01)
*H01R 12/52* (2011.01)
*H01R 13/24* (2006.01)
*H01R 13/41* (2006.01)
*H01R 13/648* (2006.01)
*H01R 103/00* (2006.01)

(52) U.S. Cl.

CPC ......... *H01R 13/502* (2013.01); *H01R 12/523* (2013.01); *H01R 13/24* (2013.01); *H01R 13/41* (2013.01); *H01R 13/648* (2013.01); *H01R 2103/00* (2013.01)

(58) Field of Classification Search

CPC .... H01R 9/096; H01R 23/722; H01R 13/502; H01R 13/24; H01R 13/41; H01R 13/648; H01R 12/523; H01R 2103/00

USPC ........................................................... 439/65

See application file for complete search history.

(56) References Cited

U.S. PATENT DOCUMENTS 4,816,789 A * 3/1989 Mars ....................... H01P 1/047 333/260
6,004,140 A * 12/1999 Kato ................. H01R 12/7082 439/637
6,109,927 A * 8/2000 Scholz ................. H01R 12/732 439/67

(Continued)

FOREIGN PATENT DOCUMENTS

CN 206301970 U 7/2017

*Primary Examiner* — Gary F Paumen
(74) *Attorney, Agent, or Firm* — Wolf, Greenfield & Sacks, P.C.

(57) ABSTRACT

An electrical connector that connects circuit boards in a coplanar manner. The electrical connector includes a frame comprising a plate, and two platforms extending above the plate and substantially parallel to each other. A housing of the electrical connector holding conductive elements is coupled to the plate of the frame such that a top surface of the housing is substantially flush with top surfaces of the two platforms. The platforms of the frame have threaded holes extending therethrough such that screws can be inserted to hold one of the two platforms of the electrical connector to a first circuit board and the other one of the two platforms of the electrical connector to a second circuit board that is substantially edge aligned to the first circuit board. Such a configuration enables connecting circuit boards of various thicknesses in a coplanar manner.

20 Claims, 10 Drawing Sheets

(56) References Cited

U.S. PATENT DOCUMENTS

| | | | | |
|---|---|---|---|---|
| 7,914,293 | B2 * | 3/2011 | Koguchi | H01R 12/714 439/74 |
| 8,197,082 | B2 * | 6/2012 | Cho | G02F 1/133603 362/249.02 |
| 8,986,020 | B2 * | 3/2015 | Ishii | H01R 12/732 439/511 |
| 11,581,687 | B2 * | 2/2023 | Wang | H01R 13/6585 |
| 2008/0293262 | A1 * | 11/2008 | Duesterhoeft | H01R 12/616 439/631 |
| 2013/0280927 | A1 * | 10/2013 | Thompson | H01R 43/0256 439/65 |

* cited by examiner

COPLANAR CARD EDGE CONNECTOR

RELATED APPLICATIONS

This application claims priority to and the benefit of Chinese Patent Application Serial No. 202120642789.6, filed on Mar. 30, 2021, entitled "ELECTRICAL CONNECTOR AND ELECTRONIC SYSTEM." The contents of this application are incorporated herein by reference in their entirety.

TECHNICAL FIELD

The present disclosure relates to electrical interconnection systems, such as those including electrical connectors, used to interconnect electronic assemblies.

BACKGROUND

Electrical connectors may be used to provide electrical connection between different electronic systems through conductive terminals. One typical type of the electrical connectors is a "card edge connector". A first circuit board (such as a mother board) and a portion of a second circuit board (such as a daughter card) on or near an edge thereof may be inserted into sockets of the card edge connector, respectively, so that conductive portions of the first and second circuit boards contact with contact portions at both ends of the conductive terminals of the card edge connector, respectively. As such, the conductive portions of the first circuit board can be electrically connected to the corresponding conductive portions of the second circuit board through the conductive terminals of the card edge connector, so that an electrical connection is established between the first and second circuit boards. In addition, the card edge connector may provide mechanical support to the inserted first and second circuit boards, so that the first and second circuit boards are held in a substantially fixed position relative to each other.

BRIEF SUMMARY

Aspects of the present disclosure relate to coplanar card edge connectors.

Some embodiments relate to an electrical connector. The electrical connector may include a frame comprising a plate, a first platform extending above the plate, the first platform comprising a first end and a second end opposite the first end, a second platform extending above the plate, the second platform comprising a third end and a fourth end, opposite the third end, wherein the second platform is substantially parallel to the first platform, a first rib extending from the first end of the first platform to the third end of the second platform, and a second rib extending from the second end of the first platform to the fourth end of the second platform; a housing coupled to the frame; a plurality of conductive terminals held by the housing and between the first rib and the second rib of the frame; and first and second power terminals held by the housing and separated by the plurality of conductive elements and the first rib and the second rib of the frame.

In some embodiments, the first platform may include a first threaded hole adjacent to the first end and a second threaded hole adjacent to the second end. The third platform may include a third threaded hole adjacent to the third end and a fourth threaded hole adjacent to the fourth end.

In some embodiments, the first platform may include one or more first locating posts between the first and second threaded holes. The second platform may include one or more second locating posts between the third and fourth threaded holes.

In some embodiments, the plate of the frame may include a first surface and a second surface opposite to the first surface. The first and second platforms may extend above the first surface of the plate by a first height. The first and second ribs may extend above the first surface of the plate by a second height. The second height may be less than the first height.

In some embodiments, the housing may be I-shaped and may include two lateral portions and a longitudinal portion connecting the two lateral portions. The longitudinal portion of the housing may be disposed between the first and second platforms of the frame.

In some embodiments, the longitudinal portion of the housing may include a top surface that is substantially flush with top surfaces of the first and second platforms of the frame.

In some embodiments, the two lateral portions of the housing each may include a chamber. The first and second power terminals may be each disposed in a respective chamber of the chambers of the two lateral portions.

In some embodiments, each of the plurality of conductive terminals may be T-shaped and may include a base, a first straight portion and a second straight portion cantilevered in opposite directions from the base, a first contact finger extending from the first straight portion and a second contact finger extending from the second straight portion.

In some embodiments, the longitudinal portion of the housing may include a plurality of slots spaced apart from each other. Each of the plurality of slots of the housing may be T-shaped and may include a vertical slot section recessed into the housing, and a first lateral slot section and a second lateral slot section each recessed into the housing and opening into the vertical slot section. Each of the plurality of slots of the housing may hold one of the plurality of conductive terminals such that the first contact finger and the second contact finger of a respective conductive terminal extend at least partially beyond a top surface of the longitudinal portion of the housing.

Some embodiments may relate to an electrical connector. The electrical connector may include a frame comprising a plate, a first platform extending above the plate, a second platform extending above the plate and substantially parallel to the first platform, a first plurality of threaded holes through the first platform and a second plurality of threaded holes through the second platform; an I-shaped housing coupled to the frame and comprising two lateral portions and a longitudinal portion connecting the two lateral portions; a plurality of conductive terminals held by the longitudinal portion of the housing; and first and second power terminals held by the two lateral portions of the housing, respectively.

In some embodiments, each of the plurality of conductive terminals may include a base, a first contact finger and a second contact finger cantilevered and extending in substantially opposite directions from the base. The bases of the plurality of conductive terminals may be aligned along a longitudinal axis.

In some embodiments, the longitudinal portion of the housing may include a bar-shaped protrusion. The plate of the frame may include a groove for receiving the bar-shaped protrusion of the longitudinal portion of the housing.

In some embodiments, each of the first and second power terminals may include a planar base, a plurality of first contact fingers cantilevered and extending from the base in a first direction, and a plurality of second contact fingers cantilevered and extending from the base in a second direction substantially opposite to the first direction. The bases of the first and second power terminals may be aligned along the longitudinal axis.

In some embodiments, the frame may be made of a metallic material so as to provide shielding to the electrical connector.

In some embodiments, wherein the frame may include a first rib extending above the plate and substantially perpendicularly to the first platform so as to provide shielding between the plurality of conductive terminals and the first power terminal, and a second rib extending above the plate and substantially parallel to the first rib so as to provide shielding between the plurality of conductive terminals and the second power terminal.

Some embodiments relate to an electronic system. The electronic system may include a first circuit board comprising a first side, a second side opposite the first side, and a first edge connecting the first and second sides, the first side comprising a first row of conductive pads along the first edge; a second circuit board comprising a third side, a fourth side opposite the third side, and a second edge connecting the third and fourth sides, the third side comprising a second row of conductive pads along the second edge; a first electrical connector comprising: a frame comprising a plate, a first platform extending above the plate, a second platform extending above the plate and in parallel to the first platform, a housing coupled to the frame and comprising two lateral portions and a longitudinal portion connecting the two lateral portions, and a plurality of conductive terminals held by the longitudinal portion of the housing, the plurality of conductive terminals each comprising a base, a first contact portion and a second contact portion on opposite sides of the base; and a plurality of screws comprising a first plurality of screws and a second plurality of screws, the first plurality of screws extending through the first printed circuit board and into threaded holes in the first platform, the second plurality of screws extending through the second printed circuit board and into threaded holes in the second platform, such that the first contact portions of the plurality of conductive terminal electrically connected to the first row of conductive pads of the first circuit board and the second contact portions of the plurality of conductive terminal electrically connected to the second row of conductive pads of the second circuit board.

In some embodiments, heads of the plurality of screws may be on the second side of the first circuit board or the fourth side of the second circuit board.

In some embodiments, the first circuit board and the second circuit board may have different thicknesses.

In some embodiments, the bases of the plurality of conductive terminals may be aligned along a longitudinal line. The plurality of screws may be disposed symmetrically with respect to the longitudinal line.

In some embodiments, the second side of the first circuit board may include a third row of conductive pads along the first edge. The fourth side of the second circuit board may include a fourth row of conductive pads along the second edge. The electronic system may include a second electrical connector constructed the same as the first electrical connector. The plurality of screws may hold the second electrical connector to the first circuit board and the second circuit board such that the first contact portions of the plurality of conductive terminal of the second electrical connector electrically connected to the third row of conductive pads of the first circuit board and the second contact portions of the plurality of conductive terminal of the second electrical connector electrically connected to the fourth row of conductive pads of the second circuit board.

According to an aspect of the present disclosure, an electrical connector is provided. The electrical connector may comprise a frame comprising a first half on one side of a longitudinal central axis and a second half on the other side of the longitudinal central axis; a housing mounted to the frame and configured for holding a plurality of conductive terminals; and a plurality of conductive terminals held by the housing. The first half of the frame may be formed with at least one first threaded hole to allow the electrical connector to be mounted to a first circuit board with a screw, and the second half of the frame may be formed with at least one second threaded hole to allow the electrical connector to be mounted to a second circuit board with a screw, so that the electrical connector is able to hold the first circuit board and the second circuit board in place relative to each other in an edge-to-edge manner and to establish an electrical connection between the first circuit board and the second circuit board through the plurality of conductive terminals.

In some embodiments, the at least one first threaded hole and the at least one second threaded hole may be arranged symmetrically about the longitudinal central axis.

In some embodiments, the at least one first threaded hole may be arranged symmetrically about a central plane of the frame perpendicular to the longitudinal central axis, and the at least one second threaded hole may be arranged symmetrically about the central plane.

In some embodiments, the frame may be in a plate-like form and may have a first surface and a second surface opposite to the first surface, the housing in an I-shaped and plate-like form, and a third surface and a fourth surface opposite to the third surface, wherein the housing may comprise two lateral portions and a longitudinal portion connecting the two lateral portions, and wherein the first surface of the frame may face the third surface of the housing.

In some embodiments, the frame further may comprise a first platform and a second platform extending a certain height from the first surface on the first half and the second half, respectively, wherein the height may be substantially equal to a thickness of the housing between the third surface and the fourth surface, wherein the first platform and the second platform may be located on each side of the longitudinal portion of the housing and between the two lateral portions, and wherein the top surfaces of the first platform and the second platform may be substantially flush with the fourth surface of the housing.

In some embodiments, the frame further may comprise a first rib and a second rib each extending a certain height from the first surface, the first rib and the second rib each extending from one of the first platform and the second platform to the other, wherein the first platform, the second platform, the first rib, and the second rib together with the first surface may bound a first cavity, wherein the heights of the first rib and the second rib may be less than those of the first platform and the second platform, and wherein the longitudinal portion may be received in the first cavity.

In some embodiments, the at least one first threaded hole and the at least one second threaded hole may be formed in areas where the first platform and the second platform are located, and may extend from the top surfaces of the first platform and the second platform through the frame to the second surface, respectively.

In some embodiments, the first platform and the second platform may be formed with a first locating post and a second locating post, respectively, wherein the first locating post and the second locating post may be configured for cooperating with corresponding alignment mechanisms of the first circuit board and the second circuit board, respectively, when the electrical connector is mounted to the first circuit board and the second circuit board, so that the electrical connector may be accurately positioned relative to the first circuit board and the second circuit board.

In some embodiments, the first locating post and the second locating post may be positioning posts or positioning tabs extending from the top surfaces of the first platform and the second platform, respectively.

In some embodiments, the plurality of conductive terminals may be arranged along the longitudinal central axis in the housing and may comprise a plurality of signal terminals and two power terminals, wherein the plurality of signal terminals may be arranged in a single row in the longitudinal portion and the two power terminals may be arranged in the two lateral portions, respectively.

In some embodiments, each of the plurality of signal terminals may be T-shaped and comprise a base, a first straight portion and a second straight portion cantilevered in opposite directions from the base, a first contact finger extending obliquely from the first straight portion and a second contact finger extending obliquely from the second straight portion, wherein the longitudinal portion of the housing may comprise a plurality of signal terminal slots spaced apart from each other along the longitudinal central axis, wherein each of the signal terminal slots may be T-shaped and comprise a vertical slot section recessed into the housing from the fourth surface, and a first lateral slot section and a second lateral slot section each recessed into the housing from the fourth surface and opening into the vertical slot section, wherein the base of the signal terminal may be inserted into the vertical slot section, with the first straight portion placed in and supported by the first lateral slot section and the second straight portion placed in and supported by the second lateral slot section, and wherein the first contact finger and the second contact finger may extend at least partially beyond the fourth surface.

In some embodiments, each of the plurality of signal terminals may be T-shaped and comprise a base, a first contact finger and a second contact finger each cantilevered and extending obliquely in substantially opposite directions from the base, wherein the longitudinal portion of the housing may comprise a plurality of signal terminal slots spaced apart from each other along the longitudinal central axis, wherein each of the signal terminal slots may be T-shaped and comprise a vertical slot section recessed into the housing from the fourth surface, and a first lateral slot section and a second lateral slot section each recessed into the housing from the fourth surface and opening into the vertical slot section, wherein the base of the signal terminal may be inserted into the vertical slot section, with the first contact finger disposed in the first lateral slot section and extending at least partially beyond the fourth surface, and the second contact finger disposed in the second lateral slot section and extending at least partially beyond the fourth surface.

In some embodiments, the first straight portion and the second straight portion of each of the signal terminals may be configured to be symmetrical about the base.

In some embodiments, the plurality of signal terminals may be arranged in such a manner that the bases thereof may be aligned along the longitudinal central axis.

In some embodiments, the first contact finger and the second contact finger of each of the signal terminals may be configured to be symmetrical about the base.

In some embodiments, the longitudinal portion further may comprise a bar-shaped protrusion protruding from the third surface and extending along the longitudinal central axis, wherein the vertical slot section may extend from the fourth surface through the bar-shaped protrusion and form an aperture in the bar-shaped protrusion, wherein the base of the signal terminal inserted into the vertical slot section may be accessible via the aperture, and wherein the frame further may comprise a receiving groove extending through the frame from a bottom surface of the first cavity to receive the bar-shaped protrusion.

In some embodiments, each of the power terminals may comprise a sheet-like base, a plurality of first contact fingers cantilevered and extending obliquely in a first direction from the base, a plurality of second contact fingers cantilevered and extending obliquely in a second direction substantially opposite to the first direction from the base, wherein the two lateral portions of the housing each may comprise a receiving chamber recessed into the housing from the fourth surface for receiving the power terminal, a first power terminal positioning member extending from a bottom surface of the receiving chamber into the receiving chamber for positioning the power terminal, and a first power terminal retention member formed in the receiving chamber for holding the power terminal, wherein the power terminal may comprise a second power terminal positioning opening and a second power terminal retention member, wherein the first power terminal positioning member and the second power terminal positioning opening may be configured for cooperating with each other when the power terminal is mounted to the housing, so that the power terminal may be accurately positioned in the receiving chamber, wherein the first power terminal retention member and the second power terminal retention member may be configured for cooperating with each other when the power terminal is mounted to the housing, so that the power terminal can be reliably secured in the receiving chamber, and wherein the plurality of first contact fingers and the plurality of second contact fingers may extend at least partially beyond the fourth surface when the power terminal is mounted to the housing.

In some embodiments, the first power terminal positioning member may comprise a positioning post extending into the receiving chamber from the bottom surface of the receiving chamber, and the second power terminal positioning opening may comprise a positioning hole extending through the base of the power terminal.

In some embodiments, the first power terminal retention member may comprise a pair of snap-fit portions formed at the side walls of the receiving chamber and opposite to each other in a direction of the longitudinal center axis, and the second power terminal retention member may comprise a pair of protruding portions extending from the power terminal in the opposite directions along the longitudinal center axis.

In some embodiments, the two power terminals may be arranged in such a manner that the bases are aligned along the longitudinal central axis.

In some embodiments, the plurality of first contact fingers and the plurality of second contact fingers may be configured to be symmetrical about the base.

In some embodiments, the housing may comprise a first attachment structure and the frame may comprise a second attachment structure, wherein the first attachment structure and the second attachment structure may be configured for cooperating with each other to secure the housing to the frame when the housing is mounted to the frame.

In some embodiments, the first attachment structure may comprise a pair of first barbed inserts extending from the third surface and the second attachment structure may comprise a pair of first slots formed in the frame for receiving the pair of first barbed inserts.

In some embodiments, the housing may comprise a first positioning structure and the frame may comprise a second positioning structure, wherein the first positioning structure and the second positioning structure may be configured for cooperating with each other to enable the housing to be accurately positioned relative to the frame when the housing may be mounted to the frame.

In some embodiments, the first positioning structure may comprise at least one positioning post extending from the third surface, and the second positioning structure may comprise at least one receiving hole formed in the frame for receiving the at least one positioning post.

In some embodiments, the first positioning structure may comprise a flange extending outwardly toward the frame at a corner of the housing, and the second positioning structure may comprise the corner of the frame, and wherein the corner of the frame may be surrounded by the flange in a tightly fitting manner when the housing may be mounted to the frame.

In some embodiments, the frame may be made of a metallic material so as to provide shielding to the plurality of conductive terminals.

According to another aspect of the present disclosure, an electronic system is provided. The electronic system may comprise: a first circuit board; a second circuit board; the aforementioned electrical connector; and screws for mounting the electrical connector to the first circuit board and the second circuit board. The electrical connector may hold the first circuit board and the second circuit board fixed relative to each other in an edge-to-edge manner and establish an electrical interconnection therebetween through the plurality of conductive terminals.

In some embodiments, the electronic system may comprise a single electrical connector, the single electrical connector may hold the first circuit board and the second circuit board may be fixed relative to each other in an edge-to-edge manner on one side of the first circuit board and the second circuit board.

In some embodiments, the first circuit board and the second circuit board may have different thicknesses.

In some embodiments, the electronic system may comprise two electrical connectors, the two electrical connectors may be disposed on each side of the first circuit board and the second circuit board and may cooperate with each other to sandwich the first circuit board and the second circuit board therebetween and may hold the first circuit board and the second circuit board fixed relative to each other in an edge-to-edge manner.

These techniques may be used alone or in any suitable combination. The foregoing summary is provided by way of illustration and is not intended to be limiting.

BRIEF DESCRIPTION OF DRAWINGS

The above and other aspects of the present disclosure will be more thoroughly understood and appreciated when read in conjunction with the accompanying drawings. The drawings are not intended to be drawn to scale. For purposes of clarity, not every component may be labeled in every drawing. In the drawings.

LIST OF REFERENCE NUMERALS

Figure 1A:
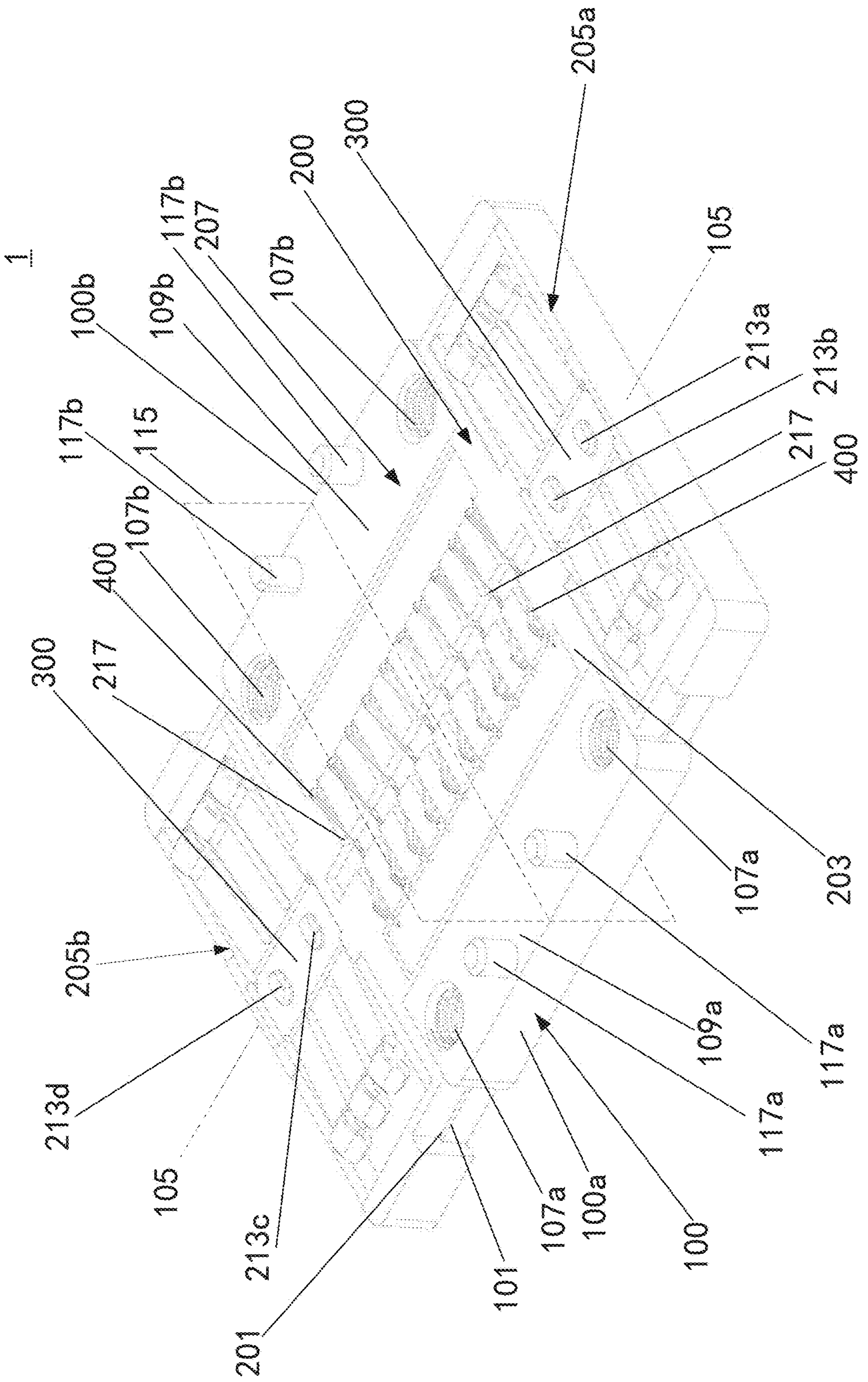
FIG. 1A is a top perspective view of an electrical connector, according to some embodiments.

1 electrical connector
100 frame
100*a* first half
100*b* second half
101 first surface
102 first end
103 second surface
104 second end
105 longitudinal central axis
106 third end
107*a* first threaded hole
107*b* second threaded hole
108 fourth end
109*a* first platform
109*b* second platform

100 plate
111*a* first rib
111*b* second rib
113 first cavity
115 center plane
117*a* first locating post
117*b* second locating post
119 receiving groove
121 second attachment structure
123 receiving hole
200 housing
201 third surface
203 fourth surface
205*a*, 205*b* lateral portions
207 longitudinal portion
209*a* first slot
209*b* second slot
211*a*, 211*b* receiving chambers
213*a*-213*d* first power terminal positioning members
215*a*-215*d* first power terminal retention members
217 signal terminal slot
217*a* vertical slot section
217*b* first lateral slot section
217*c* second lateral slot section
219 bar-shaped protrusion
220 aperture
221 first attachment structure
223 positioning post
300 power terminal
301 base
303*a* first contact finger
303*b* second contact finger
305 second power terminal positioning opening
307 second power terminal retention member
400 signal terminal
401 base
403*a* first straight portion
403*b* second straight portion
405*a* first contact finger
405*b* second contact finger
600 electronic system
601 first circuit board
603 second circuit board
604 screw
605*a* first conductive portion
605*b* third conductive portion
607*a* second conductive portion
607*b* fourth conductive portion
609*a* first corresponding alignment opening
609*b* second corresponding alignment opening
611*a* first mounting hole
611*b* second mounting hole
700 electronic system
701 first circuit board
703 second circuit board
704 screw
705*a*, 705*b*, 707*a*, 707*b* conductive portions
709*a*, 709*b* mounting holes
711*a*, 711*b* corresponding alignment mechanisms.

DETAILED DESCRIPTION

The inventors have recognized and appreciated electrical connectors that may connect circuit boards of various thicknesses in a coplanar manner. The inventors have recognized and appreciated that existing card edge connectors have limited tolerance to thickness variances of circuit boards connected in a coplanar manner. The level of tolerance is limited by either the dimensions of the sockets of a connector or the flexion ranges of terminals of connectors sandwiching the circuit boards.

The inventors have recognized and appreciated techniques that enable connecting circuit boards of various thicknesses in a coplanar manner. In some embodiments, an electrical connector may include a frame comprising a plate, and two platforms extending above the plate and substantially parallel to each other. A housing of the electrical connector holding conductive elements may be coupled to the plate of the frame. The housing may include a longitudinal portion sandwiched between the two platforms, and two lateral portions connected by the longitudinal portion. A top surface of the longitudinal portion of the housing may be substantially flush with top surfaces of the two platforms. The platforms of the frame may have threaded holes extending therethrough such that screws can be inserted to hold one of the two platforms of the electrical connector to a first circuit board and the other one of the two platforms of the electrical connector to a second circuit board that is substantially edge aligned to the first circuit board. Such a configuration enables higher tolerance of thickness variances of the circuit boards connected in a coplanar manner than prior designs in which connector could only be mounted in a top and bottom configuration. Greater variation in thickness may be accommodated because embodiments disclosed herein enables mounting a connector to only one side of the boards, which may be preferably co-planar, and the other sides of the boards, to which no connector is mounted, may not have to be co-planar. In some embodiments, the thickness of the second circuit board may vary from the thickness of the first circuit board by more than 10%, including, for example, 10-30%, 10-50%, or 10-200%.

In some embodiments, the frame may include ribs extending substantially perpendicular to the platforms, which may enable the conductive elements to be held in high density in the housing. When the housing is coupled to the plate, the ribs may be disposed between the longitudinal portion of the housing and respective lateral portions. The longitudinal portion of the housing may hold conductive terminals for transmitting signals. The lateral portions of the housing may each hold a power terminal. The frame may be made of a metallic material so as to provide shielding for the connector. The ribs of the frame may provide shielding between the signal terminals and the power terminals. Such a configuration removes the need of additional separation space between the power terminals and signal terminals.

FIGS. 1A to 1D illustrate an electrical connector 1, according to embodiments of the present disclosure. As shown in FIGS. 1A to 1D, the electrical connector 1 includes a frame 100, a housing 200 mounted to the frame 100 and configured for holding a plurality of conductive terminals, and a plurality of conductive terminals held by the housing 200, wherein the plurality of conductive terminals include a power terminal 300 and a signal terminal 400, as will be described in detail below.

Figure 2A:
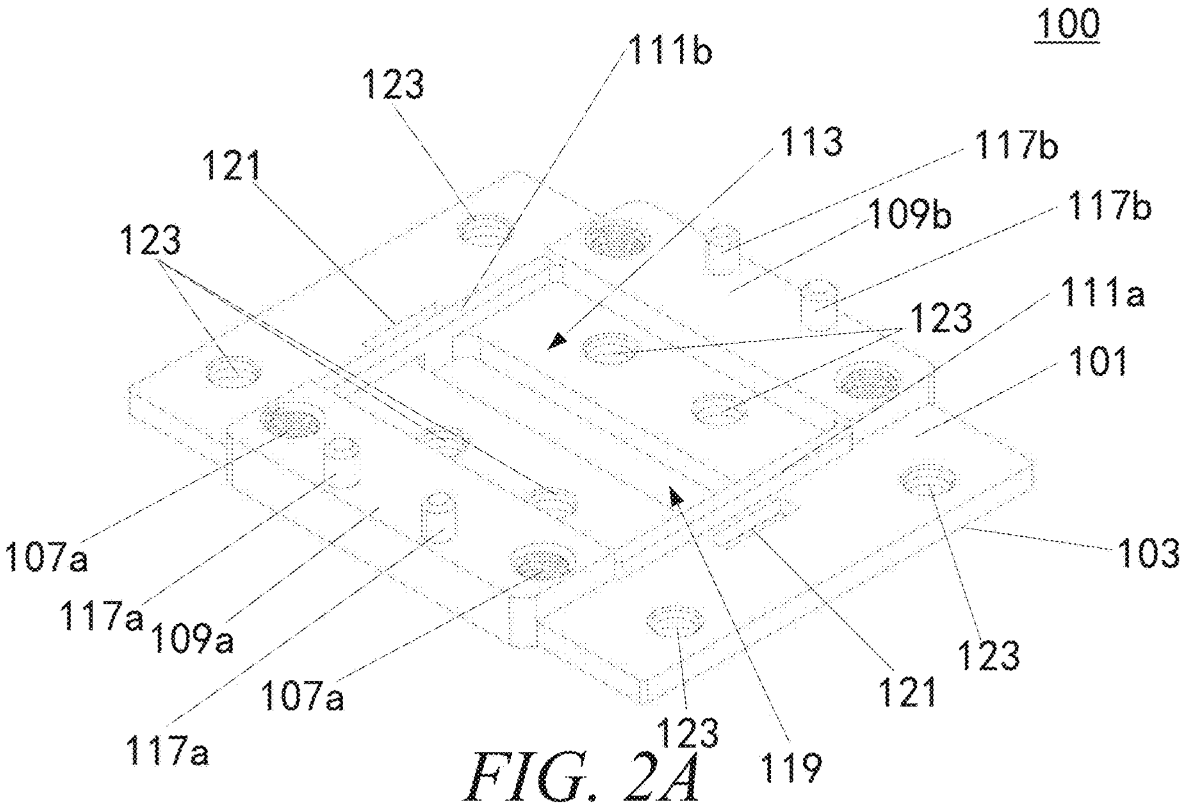
FIG. 2A is a top perspective view of a frame of the electrical connector of FIG. 1A.
Figure 2B:
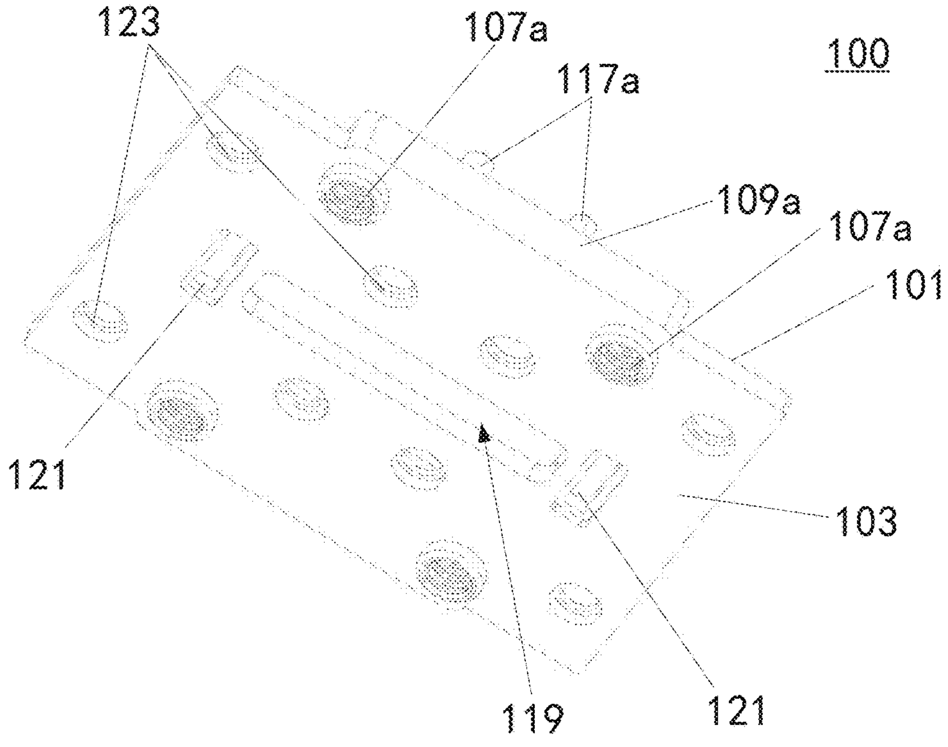
FIG. 2B is a bottom perspective view of the frame of FIG. 2A.

Referring to FIGS. 2A and 2B, the frame 100 of the electrical connector 1 shown in FIG. 1A is illustrated in detail. As shown in FIGS. 2A and 2B, the frame 100 may include a plate 110 having a first surface 101 and a second surface 103 opposite to the first surface 101. The frame 100 may be made of any suitable material by any suitable process in the art. In some embodiments, the frame 100 is made of a metallic material. The metallic materials suitable for forming the frame 100 include, but are not limited to, aluminum alloys, zinc alloys or stainless steel. As shown in FIG. 1A, the frame 100 defines a longitudinal central axis 105.

Figure 3A:
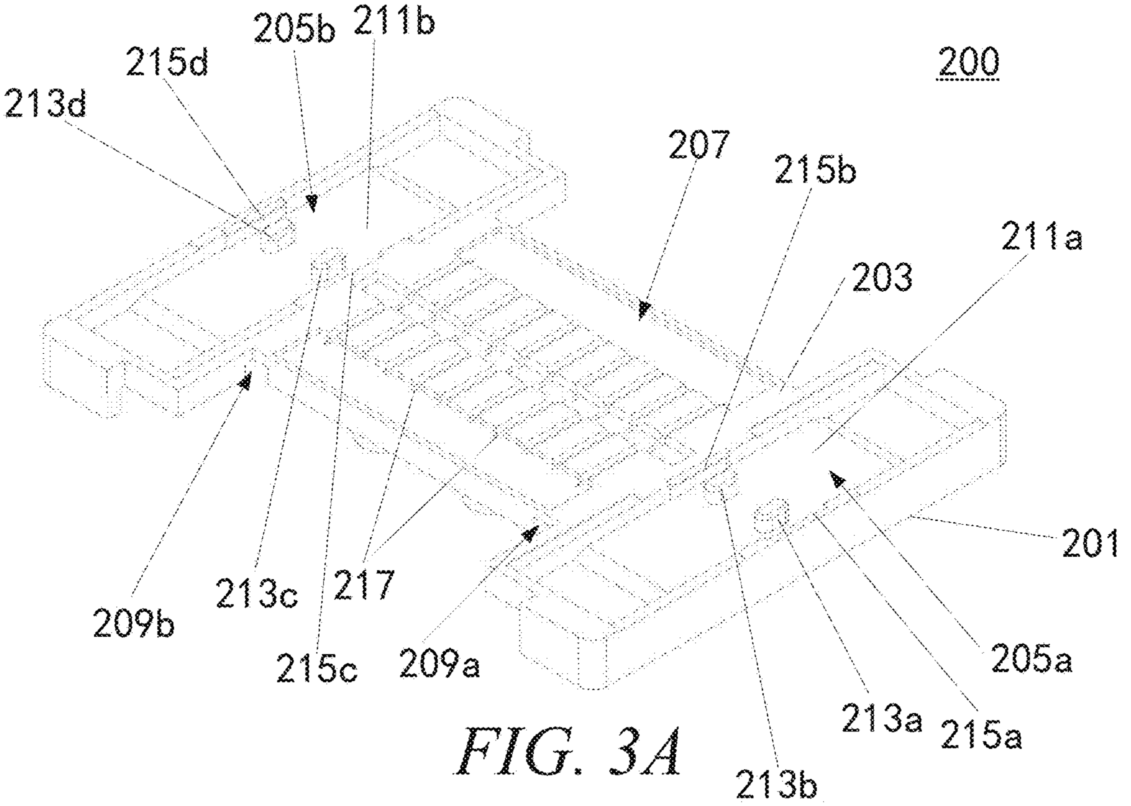
FIG. 3A is a top perspective view of a housing of the electrical connector of FIG. 1A.
Figure 3B:
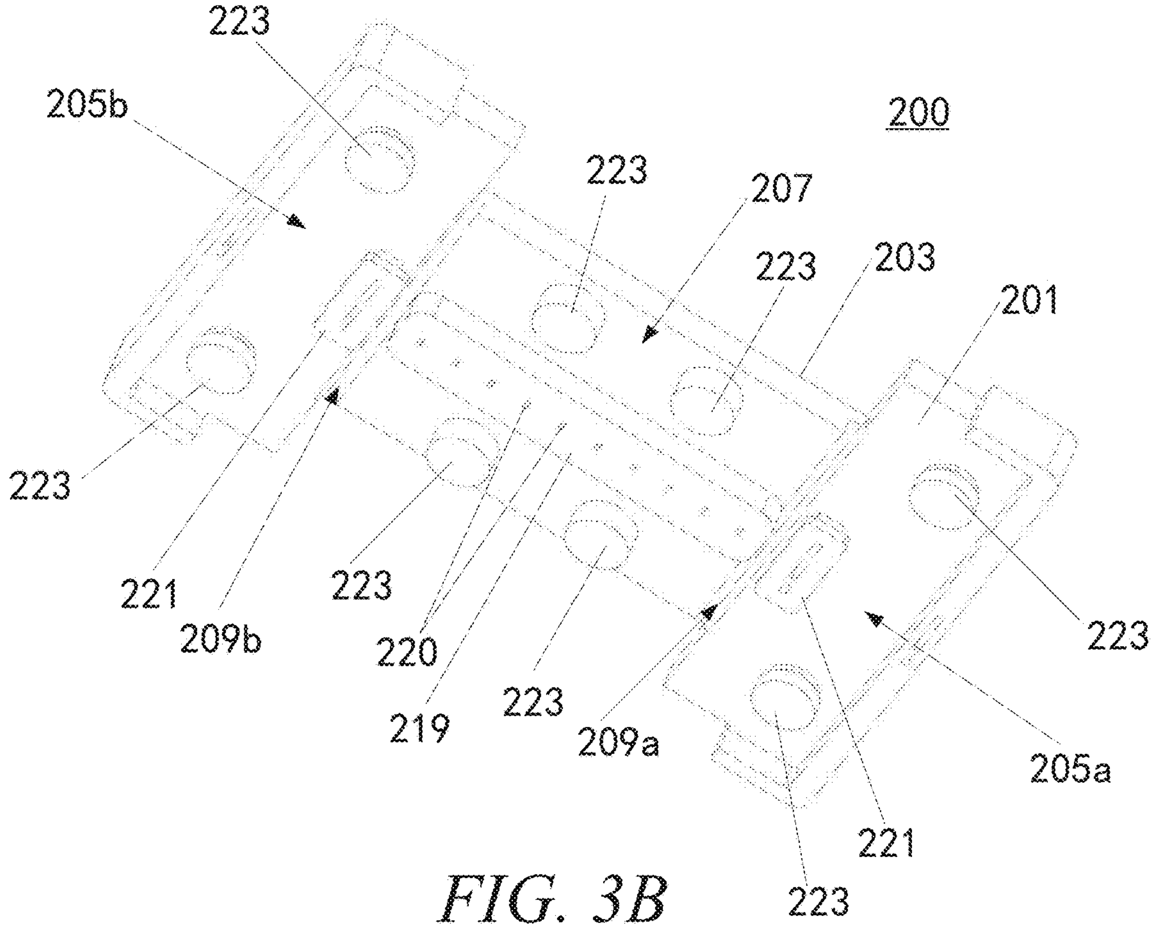
FIG. 3B is a bottom perspective view of the housing of FIG. 3A.

Referring to FIGS. 3A and 3B, the housing 200 of the electrical connector 1 shown in FIG. 1A is illustrated in detail. As shown in FIGS. 3A and 3B, the housing 200 is substantially in an I-shaped and plate-like form and has a third surface 201 and a fourth surface 203 opposite to the third surface 201. The housing 200 includes two lateral portions 205*a*, 205*b* and a longitudinal portion 207 connecting the two lateral portions 205*a*, 205*b*. The longitudinal center axis of the housing 200 substantially coincides with the longitudinal center axis 105 of the frame 100 when the housing 200 is mounted to the frame 100, thus the longitudinal center axis of the housing 200 is omitted in FIG. 1A and the longitudinal center axes of the frame 100 and the housing 200 are hereinafter referred to as "the longitudinal center axis 105". The housing 200 may be partially or entirely formed of an insulating material. Examples of insulating materials that are suitable for forming the housing 200 include, but are not limited to, plastic, nylon, liquid crystal polymer (LCP), polyphenyline sulfide (PPS), high temperature nylon or polyphenylenoxide (PPO) or polypropylene (PP). As shown in FIGS. 1A to 1D, the first surface 101 of the frame 100 faces the third surface 201 of the housing 200 when the housing 200 is mounted to the frame 100.

Figure 1B:
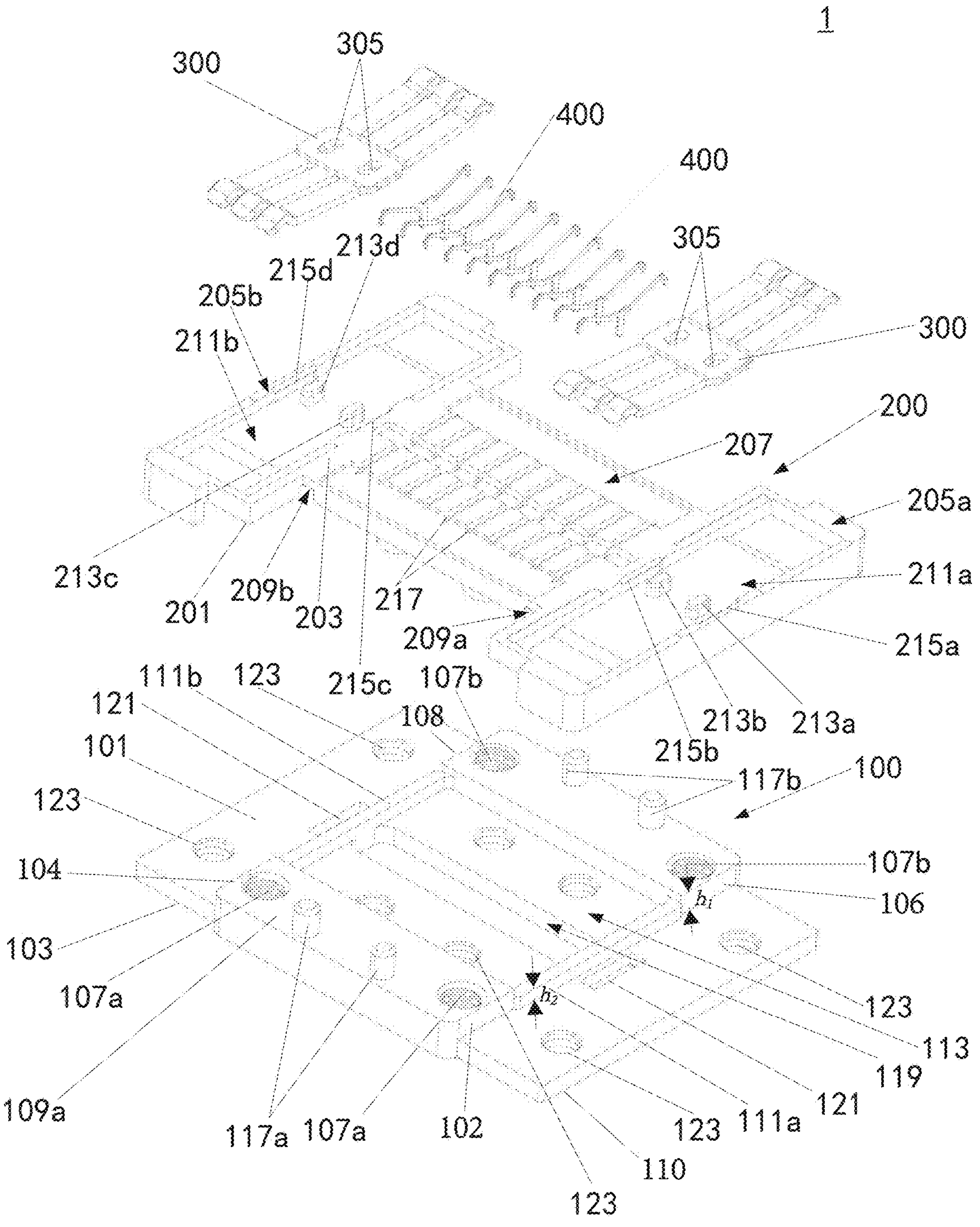
FIG. 1B is an exploded view of the electrical connector of FIG. 1A.
Figure 1C:
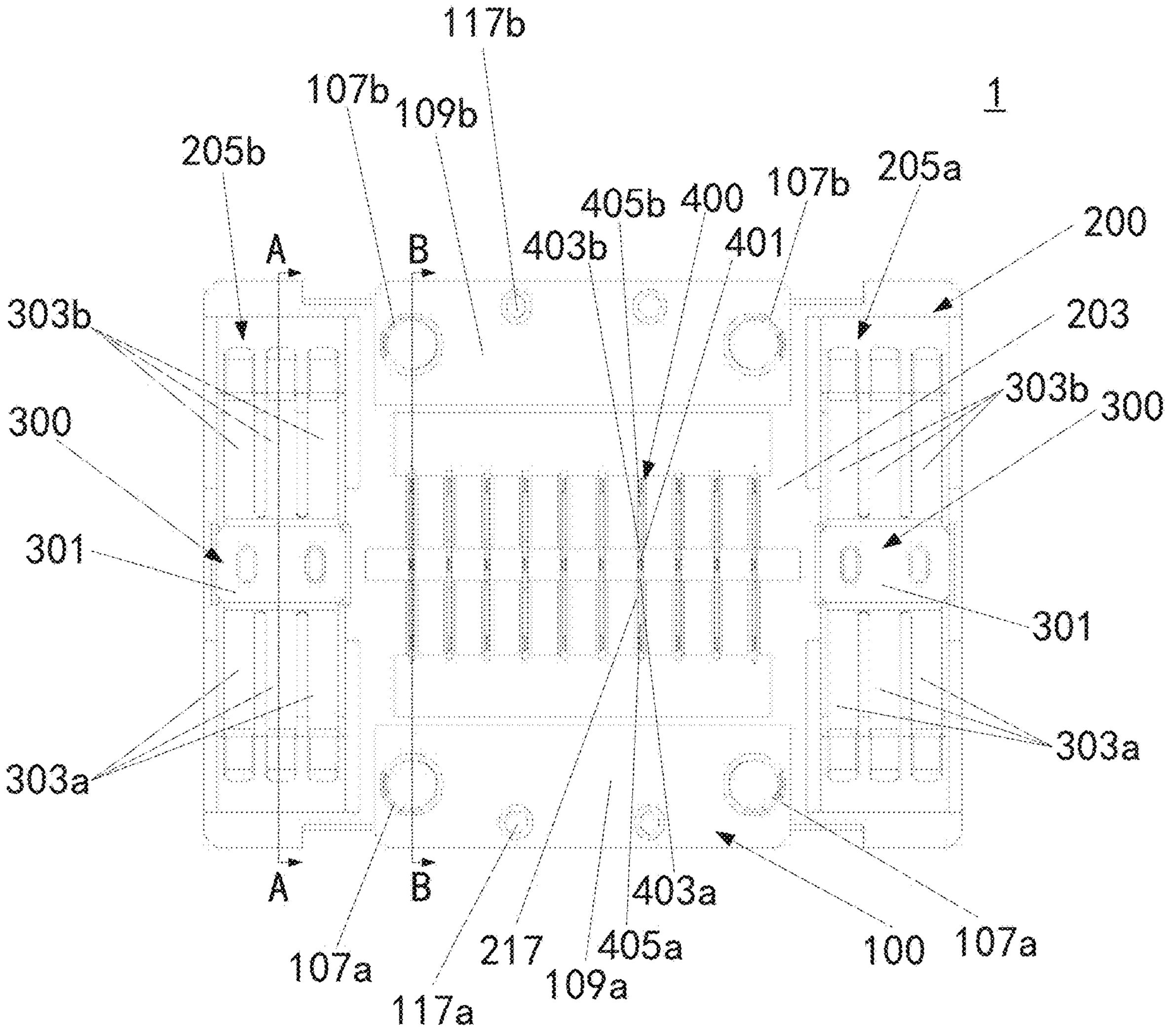
FIG. 1C is a top view of the electrical connector of FIG. 1A.

Continuing with FIGS. 1A to 1C, the plurality of conductive terminals may include a plurality (shown as two in the drawings) of power terminals 300 and a plurality (shown as ten in the drawings) of signal terminals 400. Each of the power terminals 300 and the signal terminals 400 is formed of a conductive material. The conductive material suitable for forming the conductive terminals may be a metal (e.g., copper) or a metal alloy (e.g., a copper alloy). As shown in FIG. 1A, the plurality of conductive terminals are arranged in the housing 200 along the longitudinal central axis 105 when the electrical connector 1 is in an assembly state. The plurality of signal terminals 400 are arranged in a single row in the longitudinal portion 207 of the housing 200. The plurality of power terminals 300 are arranged in the two lateral portions 205*a*, 205*b* of the housing 200. In some examples, as shown in FIG. 1A, the electrical connector 1 includes two power terminals 300 each arranged in a corresponding one of the two lateral portions 205*a*, 205*b* of the housing 200.

Turning to FIGS. 4A to 4E, one of the power terminals 300 is illustrated in detail. The power terminal 300 includes a base 301 having a substantially sheet-like form, a plurality of first contact fingers 303*a* cantilevered and extending diagonally from the base 301 in a first direction, and a plurality of second contact fingers 303*b* cantilevered and extending diagonally from the base 301 in a second direction substantially opposite to the first direction.

As shown in FIG. 3A, the two lateral portions 205*a*, 205*b* of the housing 200 include receiving chambers 211*a*, 211*b* each recessed into the housing 200 from the fourth surface 203 for receiving the power terminals, first power terminal positioning members 213*a*-213*d* each extending from a bottom surface of the receiving chamber 211*a*, 211*b* into the receiving chamber 211*a*, 211*b* for positioning the power terminals 300, and first power terminal retention members 215*a-d* formed in the receiving chambers 211*a*, 211*b* for holding the power terminals 300, respectively.

Turning back to FIGS. 4A to 4E, the power terminal 300 includes a second power terminal positioning opening 305 and a second power terminal retention member 307 provided at the base 301. The first power terminal positioning members 213*a*-213*d* of the housing 200 and the second power terminal positioning openings 305 of the power terminals 300 are configured to cooperate with each other when the power terminals 300 are mounted to the housing 200, so that the power terminals 300 can be accurately positioned in the receiving chambers 211*a*, 211*b*. The first power terminal retention members 215*a-d* of the housing 200 and the second power terminal retention member 307 of the power terminals 300 are configured to cooperate with each other when the power terminals 300 are mounted to the housing 200, so that the power terminals 300 can be reliably secured in the receiving chambers 211*a*, 211*b*.

In some examples, as shown in FIG. 3A, the first power terminal positioning members 213*a*-213*d* of the housing 200 are positioning posts extending from the bottom surfaces of the receiving chamber 211*a*, 211*b* into the receiving chamber 211*a*, 211*b*, and as shown in FIGS. 4A to 4D, the second power terminal positioning opening 305 of the power terminals 300 are positioning holes extending through the bases 301 of the power terminals 300. The positioning posts and positioning holes are configured to cooperate with each other when the power terminals 300 are mounted to the housing 200, so that the power terminals 300 can be accurately positioned in the receiving chambers 211*a*, 211*b*. It should be appreciated that in some examples, the first power terminal positioning members 213*a*-213*d* of the housing 200 may be positioning holes, and the second power terminal positioning openings 305 of the power terminals 300 may be positioning posts. It should also be appreciated that the first power terminal positioning members 213*a*-213*d* and the second power terminal positioning openings 305 may be in any other suitable form.

In some examples, as shown in FIG. 3A, the first power terminal retention members 215*a*, 215*b* and 215*c*, 215*d* of the housing 200 are a pair of snap-fit portions formed at side walls of the receiving chambers 211*a*, 211*b* and opposite to each other in the direction of the longitudinal center axis 105, respectively, and as shown in FIGS. 4A to 4D, the second power terminal retention member 307 of the power terminal 300 is a pair of protruding portions extending from the power terminal 300 in opposite directions along the direction of the longitudinal center axis 105. The snap-fit portions and the protruding portions are configured to cooperate with each other when the power terminals 300 are mounted to the housing 200, so that the power terminals 300 can be reliably secured in the receiving chambers 211*a*, 211*b*. The snap-fit portions and the protruding portions cooperate so that the top surface of the base 301 may be flush with the fourth surface 203 of the housing 200 when the power terminals 300 are secured in the receiving chambers 211*a*, 211*b*. It should be appreciated that the first power terminal retention members 215*a-d* and the second power terminal retention members 307 may be in any other suitable form.

Figure 4B:
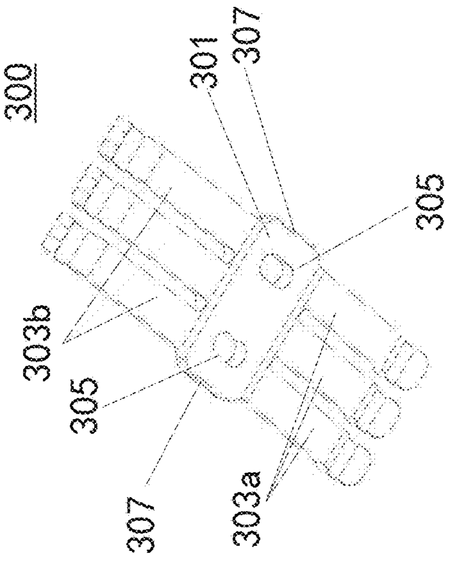
FIG. 4B is a bottom perspective view of the power terminal of FIG. 4A.
Figure 4E:
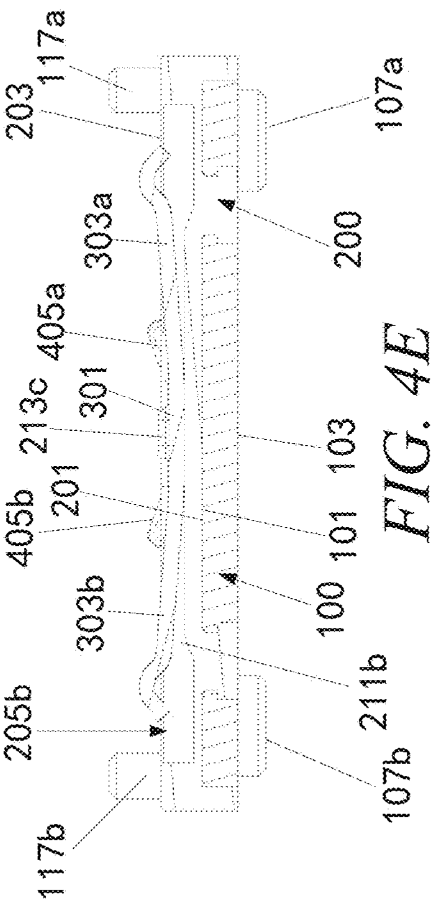
FIG. 4E is a cross-sectional view of the electrical connector of FIG. 1A taken along a line marked "A-A" in FIG. 1C.
Figure 4A:
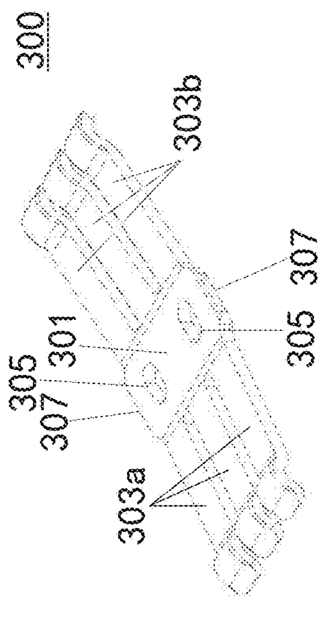
FIG. 4A is a top perspective view of a power terminal of the electrical connector of FIG. 1A.
Figure 4C:
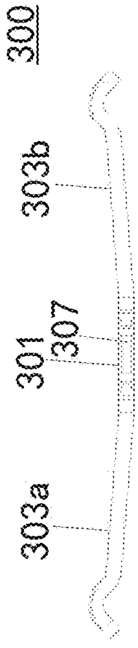
FIG. 4C is a front view of the power terminal of FIG. 4A.
Figure 4D:
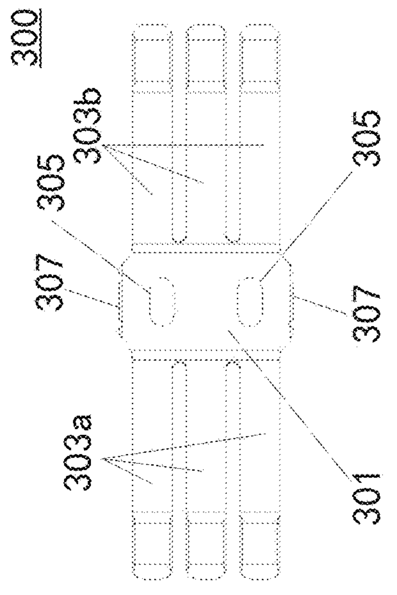
FIG. 4D is a top plan view of the power terminal shown in FIG. 4A.

As shown in FIG. 4E, when the power terminal 300 is mounted into the receiving chamber 211*a* or 211*b*, the plurality of first contact fingers 303*a* and the plurality of second contact fingers 303*b* of the power terminal 300 extend at least partially beyond the fourth surface 203 of the housing 200, so that the plurality of first contact fingers 303*a* and the plurality of second contact fingers 303*b* can contact with corresponding conductive portions of first and second circuit boards to transmit power therebetween, as will be described in detail below.

In some examples, as shown in FIG. 1C, the plurality of power terminals 300 are arranged in such a manner that the bases 301 thereof are aligned along the longitudinal central axis 105. Further, in some examples, as shown in FIG. 1C, the plurality of first contact fingers 303*a* and the plurality of second contact fingers 303*b* of each of the plurality of power terminals 300 are configured to be symmetrical about the base 301. It should be appreciated that the base 301, the plurality of first contact fingers 303*a*, and the plurality of second contact fingers 303*b* may be in any other suitable form.

Turning to FIGS. 5A to 5D, one of the signal terminals 400 is illustrated in detail. The signal terminal 400 is substantially T-shaped and includes a base 401, a first straight portion 403*a* and a second straight portion 403*b* cantilevered in opposite directions from the base 401, a first contact finger 405*a* extending obliquely from the first straight portion 403*a*, and a second contact finger 405*b* extending obliquely from the second straight portion 403*b*.

Figure 5B:
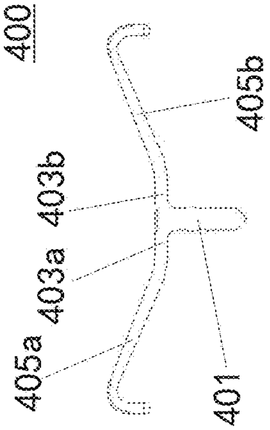
FIG. 5B is a front plan view of the signal terminal of FIG. 5A.
Figure 5C:
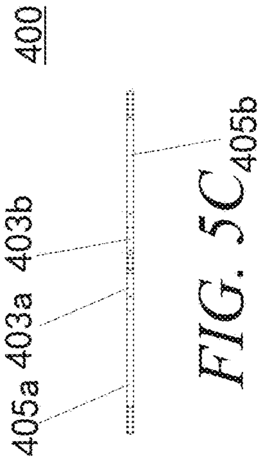
FIG. 5C is a top plan view of the signal terminal of FIG. 5A.
Figure 5A:
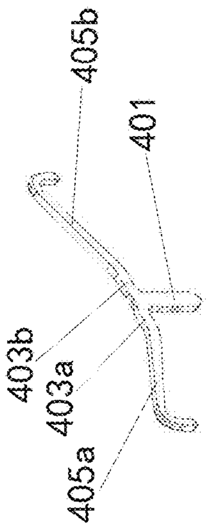
FIG. 5A is a perspective view of a signal terminal of the electrical connector of FIG. 1A.
Figure 5D:
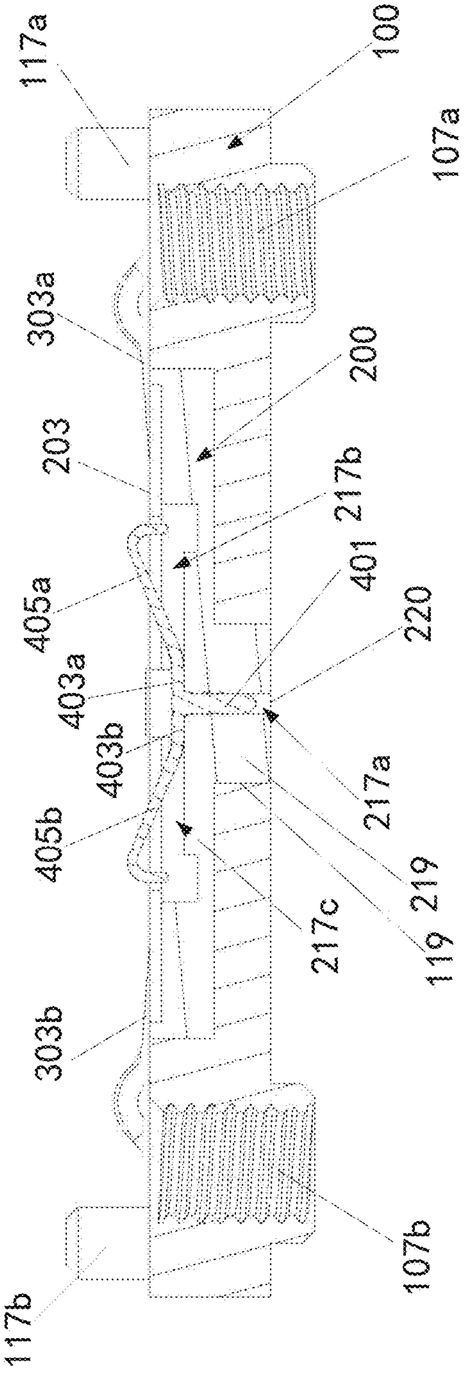
FIG. 5D is a cross-sectional view of the electrical connector of FIG. 1A taken along a line marked "B-B" in FIG. 1C.

As shown in FIGS. 1A and 3A, the longitudinal portion 207 of the housing 200 includes a plurality of signal terminal slots 217 spaced from each other along the longitudinal central axis 105. As shown in FIG. 5D, each signal terminal slot 217 is substantially T-shaped and includes a vertical slot section 217*a* recessed into the housing 200 from the fourth surface 203, and a first lateral slot section 217*b* and a second lateral slot section 217*c* each recessed into the housing 200 from the fourth surface 203 and opening into the vertical slot section 217*a*. The base 401 of the signal terminal 400 is inserted into the vertical slot section 217*a*, with the first straight portion 403*a* placed in and supported by the first lateral slot section 217*b*, and the second straight portion 403*b* placed in and supported by the second lateral slot section 217*c*. Supporting the first straight portion 403*a* by the first lateral slot section 217*b* and supporting the second straight portion 403*b* by the second lateral slot section 217*c* facilitate providing additional support to the signal terminal 400. As shown in FIGS. 5A to 5D, the base 401 may be formed with barbs to enable the signal terminal 400 to be securely held in the signal terminal slot 217.

It should be appreciated that the signal terminal 400 may be provided without the first straight portion 403*a* and the second straight portion 403*b*. That is, the signal terminal 400 includes a base 401, a first contact finger 405*a* and a second contact finger 405*b* cantilevered and extending obliquely in substantially opposite directions from the base 401. In this case, when the base 401 of the signal terminal 400 is inserted into the vertical slot section 217*a*, the first contact finger 405*a* is disposed in the first lateral slot section 217*b* and extends at least partially beyond the fourth surface 203, and the second contact finger 405*b* is disposed in the second lateral slot section 217*c* and extends at least partially beyond the fourth surface 203.

As shown in FIG. 5D, when the signal terminal 400 is secured in the vertical slot section 217*a*, the first contact finger 405*a* and the second contact finger 405*b* of the signal terminal 400 extend at least partially beyond the fourth surface 203 of the housing 200, so that the first contact finger 405*a* and the second contact finger 405*b* can contact with corresponding conductive contact portions of first and second circuit boards to transmit signals therebetween, as will be described in detail below. The plurality of signal terminals 400 may be configured for transmitting differential signals. These terminals may include a plurality of terminal groups, each of which may include three terminals, namely, a ground terminal ("G"), a first signal transmission terminal ("S"), and a second signal transmission terminal ("S"). The ground terminal, the first signal transmission terminal and the second transmission signal terminal may have the same configurations. However, in some embodiments, the ground terminal may have a configuration different from those of the first and second signal transmission terminals. The first and second signal transmission terminals may form a differential signal pair for transmitting signals. For example, the first signal transmission terminal may be energized by a first voltage, and the second signal transmission terminal may be energized by a second voltage. The voltage difference between the first and second signal transmission terminals represents a signal. The plurality of signal terminals 400 may include a plurality of pairs of signal transmission terminals for transmitting signals. The ground terminals may be arranged adjacent to each pair of signal transmission terminals to control the impedance of these terminals and to reduce crosstalk between signals, thereby improving signal integrity. These terminals may be aligned in the housing 200 in a "G-S-S-G-S-S . . . G-S-S" pattern, with two adjacent pairs of signal transmission terminals sharing a ground terminal.

In some examples, as shown in FIG. 1C, the plurality of signal terminals 400 are arranged in such a manner that the bases 401 are aligned along the longitudinal central axis 105. Further, in some examples, as shown in FIG. 1C, the first straight portion 403*a* and the second straight portion 403*b* of each signal terminal 400 are configured to be symmetrical about the base 401. In addition, in some examples, as shown in FIG. 1C, the first contact finger 405*a* and the second contact finger 405*b* of each signal terminal 400 are configured to be symmetrical about the base 401. It should be appreciated that the base 401, the first straight portion 403*a*, the second straight portion 403*b*, the first contact finger 405*a*, and the second contact finger 405*b* may be in any other suitable form.

Referring back to FIG. 1A, the frame 100 includes a first half 100*a* on one side of the longitudinal center axis 105 and a second half 100*b* on the other side of the longitudinal center axis 105. The first half 100*a* may be integrally formed with the second half 100*b*. As illustrated, the first half 100*a* of the frame 100 is formed with at least one first threaded hole 107*a* to enable the electrical connector 1 to be mounted to the first circuit board with a screw (not shown in FIG. 1A), and the second half 100*b* of the frame 100 is formed with at least one second threaded hole 107*b* to enable the electrical connector 1 to be mounted to the second circuit board with a screw (not shown in FIG. 1A), thereby enable the electrical connector 1 to hold the first and second circuit boards in place relative to each other in an edge-to-edge manner and to establish an electrical connection therebetween through a plurality of conductive terminals, as will be described in detail below.

In some examples, as shown in FIG. 1A and FIG. 1C, the at least one first threaded hole 107*a* and the at least one second threaded hole 107*b* are arranged symmetrically about the longitudinal center axis 105. In some examples, as shown in FIGS. 1A and 1C, the at least one first threaded hole 107*a* is arranged symmetrically about a center plane 115 of the frame 100 perpendicular to the longitudinal center axis 105, and the at least one second threaded hole 107*b* is arranged symmetrically about the center plane 115. In some examples, as shown in FIGS. 1A and 1C, the at least one first threaded hole 107*a* and the at least one second threaded hole 107*b* are arranged symmetrically about the longitudinal center axis 105 and about the center plane 115. The advantages of the three configurations will be explained in detail below in connection with FIGS. 7A to 7C.

As shown in FIGS. 1A to 1C and 2A, the frame 100 further includes a first platform 109*a* extending from a first end 102 to a second end 104, and a second platform 109*b* extending from a third end 106 to a fourth end 108. The first platform 109*a* and the second platform 109*b* each may extend by a first height $h_1$ from the first surface 101 of the plate 110. The height may be substantially equal to the thickness of the housing 200 between the third surface 201 and the fourth surface 203. As shown in FIG. 1A, the first platform 109*a* and the second platform 109*b* are configured to be located on opposite sides of the longitudinal portion 207 of the housing 200 and between the two lateral portions 205*a*, 205*b*, respectively, when the housing 200 is mounted to the frame 100. Since the heights of the first platform 109*a* and the second platform 109*b* are substantially equal to the thickness of the housing 200 between the third surface 201 and the fourth surface 203, the top surfaces of the first platform 109*a* and the second platform 109*b* may be substantially flush with the fourth surface 203 of the housing 200. This allows the surface portion of the electrical connector 1 facing a circuit board when mounted to the circuit board to be substantially flat.

As described above, since the plurality of first contact fingers 303*a* and the plurality of second contact fingers 303*b* of each of the power terminals 300 extend at least partially beyond the fourth surface 203 of the housing 200, the plurality of first contact fingers 303*a* and the plurality of second contact fingers 303*b* of each of the power terminals 300 also extend at least partially beyond the top surfaces of the first platform 109*a* and the second platform 109*b*. This facilitates the contact between the plurality of first contact fingers 303*a* and the plurality of second contact fingers 303*b* of each of the power terminals 300 with the corresponding conductive portions of the circuit board.

As described above, since the first contact finger 405*a* and the second contact finger 405*b* of each of the signal terminals 400 extend at least partially beyond the fourth surface 203 of the housing 200, the first contact finger 405*a* and the second contact finger 405*b* of each of the signal terminals 400 also extend at least partially beyond the top surfaces of the first platform 109*a* and the second platform 109*b*. This facilitates the contact between the first contact finger 405*a* and the second contact finger 405*b* of each of the signal terminals 400 with the corresponding conductive portions of the circuit board.

As shown in FIGS. 1B and 2A, the frame 100 further includes a first rib 111*a* extending from the first end 102 of the first platform 109*a* to the third end 106 of the second platform 109*b*, and a second rib 111*b* extending from the second end 104 of the first platform 109*a* to the fourth end 108 of the second platform 109*b*. The first rib 111*a* and the second rib 111*b* each may extend by a second height $h_2$ from the first surface 101. The first platform 109*a*, the second platform 109*b*, the first rib 111*a*, and the second rib 111*b* together with the first surface 101 (in particular, the portion of the first surface 101 surrounded by the first platform 109*a*, the second platform 109*b*, the first rib 111*a*, and the second rib 111*b*) may bound a first cavity 113. The heights of the first rib 111*a* and the second rib 111*b* are less than the heights of the first platform 109*a* and the second platform 109*b*. The first cavity 113 is used for receiving the longitudinal portion 207 of the housing 200. As shown in FIG. 3A, the housing 200 includes a first slot 209*a* and a second slot 209*b* each recessed into the housing 200 from the third surface 201. In some examples, as shown in FIG. 3A, the first slot 209*a* and the second slot 209*b* are each formed at portions of the housing 200 where the longitudinal portion 207 intersects the two lateral portions 205*a*, 205*b*. The first slot 209*a* and the second slot 209*b* each extend from one side of the longitudinal portion 207 across the longitudinal portion 207 to the other side. When the housing 200 is mounted to the frame 100, the longitudinal portion 207 is received (e.g., snaps) between the first platform 109*a* and the second platform 109*b*, and the first rib 111*a* and the second rib 111*b* are received in (e.g., snaps into) the first slot 209*a* and the second slot 209*b*, respectively. As such, the longitudinal portion 207 is received in the first cavity 113. Receiving the longitudinal portion 207 in the first cavity 113 can prevent the longitudinal portion 207 from moving in a direction parallel to the first surface 101. Further, the first cavity 113 can provide improved mechanical support to the housing 200, which is particularly advantageous in the case where the housing 200 is thin, so as to enable effective prevention of deformation of the housing 200, thereby providing a protection to the signal terminals 400 received in the longitudinal portion 207. In addition, the longitudinal portion 207 is received in the first cavity 113, so that the signal terminal 400*s* mounted into the signal terminal slots 217 of the longitudinal portion 207 can be received in the first cavity 113. In the case where the frame 100 is made of a metallic material, surrounding the longitudinal portion 207 with the first platform 109*a*, the second platform 109*b*, the first rib 111*a* and the second rib 111*b* of the frame 100 and the portion of the first surface 101 surrounded by the first platform 109*a*, the second platform 109*b*, the first rib 111*a* and the second rib 111*b* can provide shielding to the signal terminals 400, reducing interference to the signal terminals 400, thereby improving signal integrity.

As shown in FIGS. 1A to 1C and FIGS. 2A to 2B, the at least one first threaded hole 107*a* and the at least one second threaded hole 107*b* are formed in the area where the first platform 109*a* and the second platform 109*b* are located, and extend from the top surfaces of the first platform 109*a* and the second platform 109*b* through the frame 100 to the second surface 103, respectively. The at least one first threaded hole 107*a* and the at least one second threaded hole 107*b* may be formed through any suitable process in the art, such as machining.

In some examples, the first platform 109*a* and the second platform 109*b* may also be formed with a first locating post 117*a* and a second locating post 117*b*, respectively. The first locating post 117*a* and the second locating post 117*b* are configured to cooperate with corresponding alignment mechanisms of the first circuit board and the second circuit board, respectively, when the electrical connector 1 is mounted to the first circuit board and the second circuit board, so as to enable the electrical connector 1 to be accurately positioned relative to the first circuit board and the second circuit board, which will be described in detail below in connection with FIGS. 6A to 7B. As shown in FIGS. 1A to 1C and FIGS. 2A to 2B, the first locating post 117*a* and the second locating post 117*b* are positioning posts extending from the top surfaces of the first platform 109*a* and the second platform 109*b*. It should be appreciated that the first locating post 117*a* and the second locating post 117*b* may also be positioning tabs extending from the top surfaces of the first platform 109*a* and the second platform 109*b*, so as to reduce the sizes of the corresponding alignment mechanisms of the first circuit board and the second circuit board, thereby increasing the space available on the first circuit board and the second circuit board.

In some examples, as shown in FIG. 3B, the longitudinal portion 207 of the housing 200 also includes a bar-shaped protrusion 219 protruding from the third surface 201 and extending along the longitudinal central axis 105. The vertical slot section 217*a* of each of the signal terminal slots

217 may extend from the fourth surface through the bar-shaped protrusion 219 and form an aperture 220 in the bar-shaped protrusion 219. As shown in FIG. 5D, when the signal terminal 400 is inserted into the vertical slot section 217*a*, the base 401 of the signal terminal 400 can be accessed via the aperture 220. This allows a user to check the signal terminal 400 via the aperture 220 with a check tool, such as a power detector pen, when the electrical connector 1 is connected between the first and second circuit boards, without disconnecting the electrical connector 1 from the first and second circuit boards. The frame 100 also includes a receiving groove 119 extending through the frame 100 from a bottom surface of the first cavity 113 to receive the bar-shaped protrusion 219 of the housing 200. The height of the bar-shaped protrusion 219 may be equal to the thickness of the frame 100 between the first surface 101 and the second surface 103, so that the top surface of the bar-shaped protrusion 219 is substantially flush with the second surface 103 of the frame 100, when the bar-shaped protrusion 219 is received in the receiving groove 119.

Figure 1D:
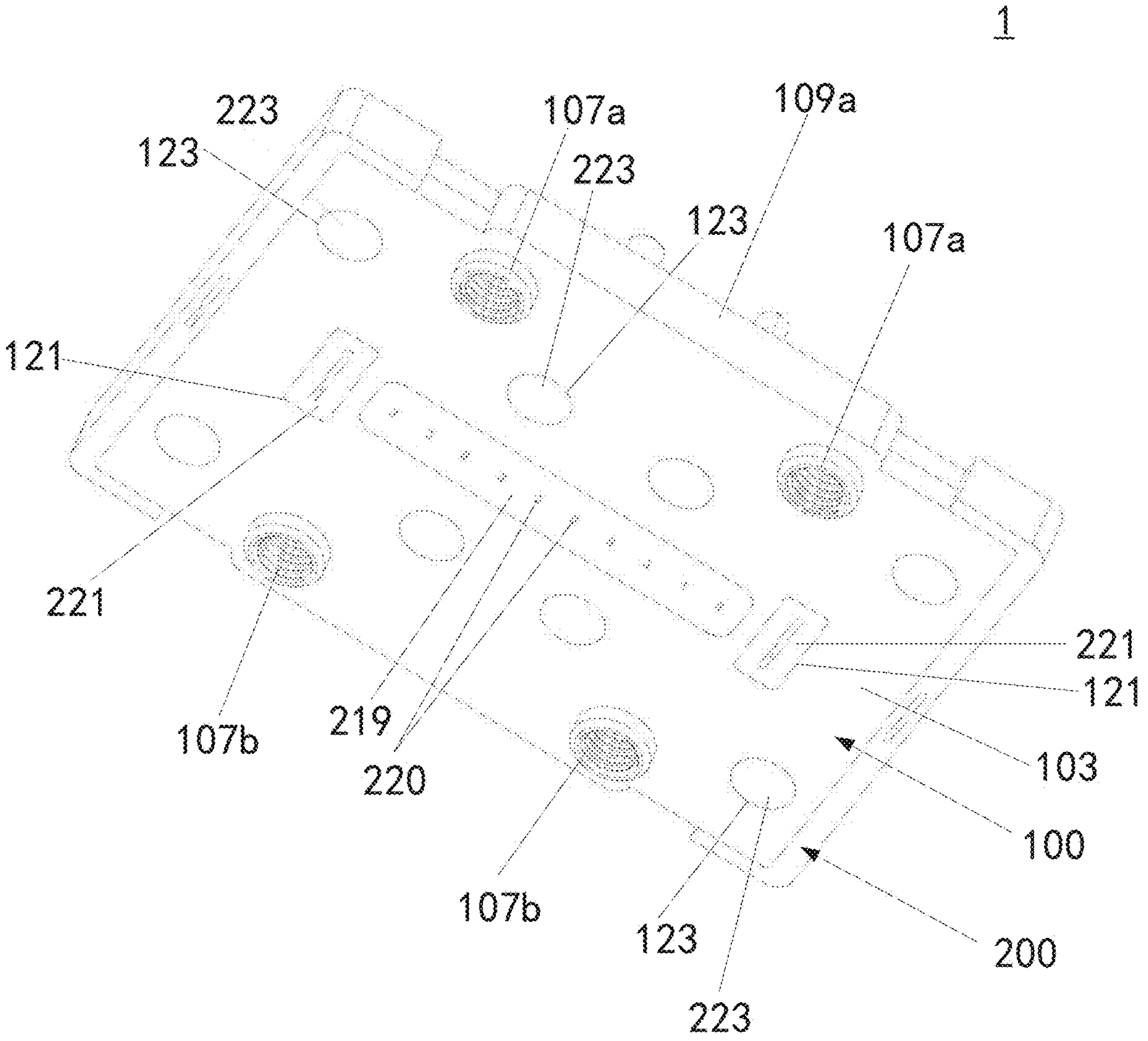
FIG. 1D is a bottom perspective view of the electrical connector of FIG. 1A.

In some examples, as shown in FIG. 3B, the housing 200 includes a first attachment structure 221, and as shown in FIG. 1B and FIGS. 2A to 2B, the frame 100 includes a second attachment structure 121. As shown in FIG. 1D, the first attachment structure 221 and the second attachment structure 121 are configured to cooperate with each other to secure the housing 200 to the frame 100 when the housing 200 is mounted to the frame 100. In some examples, as shown in FIG. 3B, the first attachment structure 221 may be a pair of first barbed inserts extending from the third surface 201 of the housing 200, and as shown in FIG. 1B and FIGS. 2A to 2B, the second attachment structure 121 may be a pair of first slots formed in the frame 100 for receiving the pair of first barbed inserts of the housing 200. The first inserts and the first slots are configured to cooperate with each other to secure the housing 200 to the frame 100, when the housing 200 is mounted to the frame 100.

In some examples, as shown in FIG. 3B, the housing 200 includes a first positioning structure, and as shown in FIG. 1B and FIGS. 2A to 2B, the frame 100 includes a second positioning structure. As shown in FIG. 1D, the first positioning structure and the second positioning structure are configured to cooperate with each other to enable the housing 200 to be accurately positioned relative to the frame 100 when the housing 200 is mounted to the frame 100. In some examples, the first positioning structure is at least one positioning post 223 (shown as eight in FIG. 3B) extending from the third surface 201 of the housing 200, and the second positioning structure is at least one receiving aperture 123 (shown as eight in FIG. 1B and FIGS. 2A to 2B) formed in the frame 100 for receiving the at least one positioning post 223 of the housing 200. Additionally or alternatively, the first positioning structure is a flange extending outwardly toward the frame 100 at a corner of the housing 200 (as shown in FIG. 3B), and the second positioning structure is the corner of the frame 100 itself (as shown in FIG. 1B and FIGS. 2A to 2B). As shown in FIG. 1D, when the housing 200 is mounted to the frame 100, the corners of the frame 100 are surrounded by the flange in a tightly fitting manner.

Figure 6B:
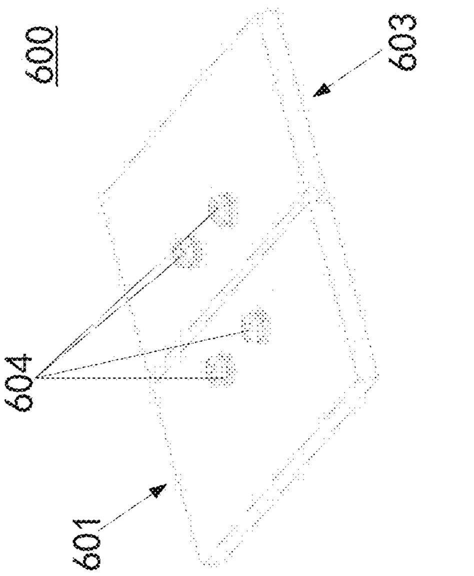
FIG. 6B is a top perspective view of an electronic system having two circuit boards connected by one electrical connector, according to some embodiments.
Figure 6C:
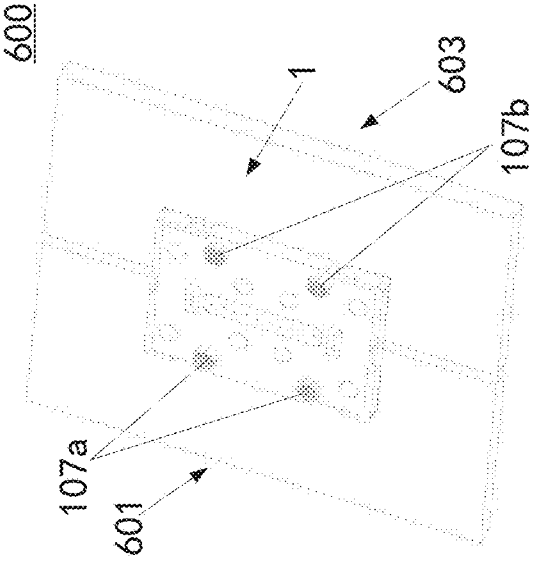
FIG. 6C is a bottom perspective view of the electronic system of FIG. 6B.
Figure 6A:
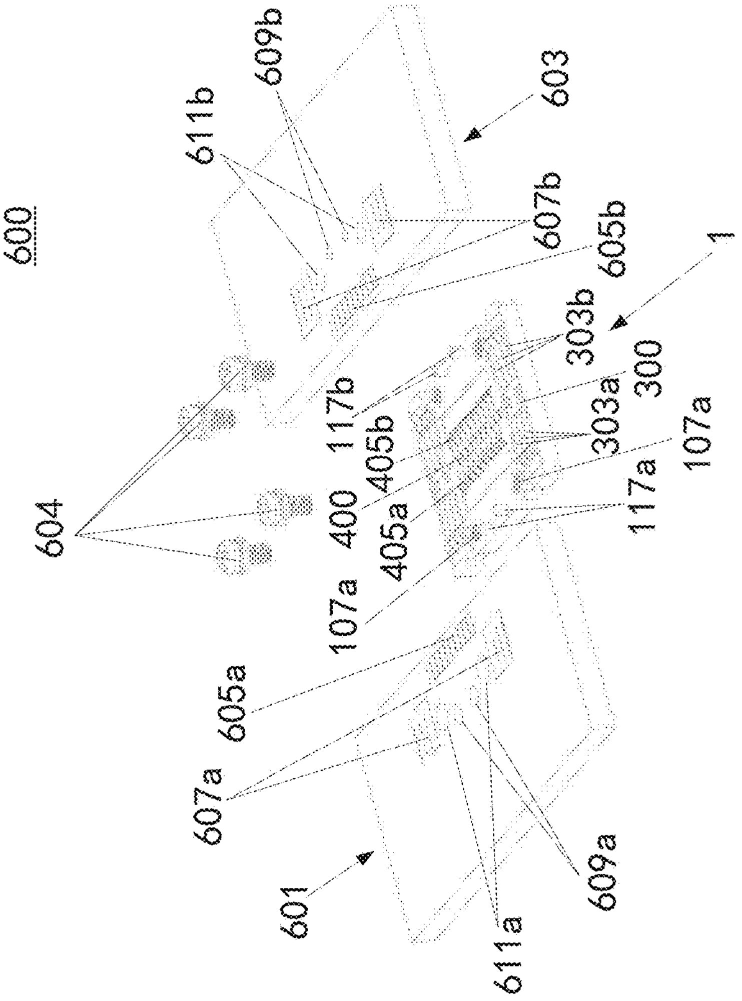
FIG. 6A is an exploded view of the electronic system of FIG. 6B.

FIGS. 6A to 6C illustrate an electronic system 600 including a first circuit board 601, a second circuit board 603, a single aforementioned electrical connector 1, and screws 604 for mounting the electrical connector 1 to the first circuit board 601 and the second circuit board 603. As shown in FIGS. 6B and 6C, the electrical connector 1 is capable of holding the first circuit board 601 and the second circuit board 603 in place relative to each other in an edge-to-edge manner on one side of the first circuit board 601 and the second circuit board 603 and establishing an electrical interconnection therebetween through a plurality of conductive terminals. As used herein, holding two circuit boards in place relative to each other in an edge-to-edge manner means holding the two circuit boards in place relative to each other in a manner where the edges of the two circuit boards are opposite to each other and the two circuit boards are substantially aligned in the same plane.

As shown in FIG. 6A, the first circuit board 601 includes, on one side, a first conductive portion 605*a* for mating with the plurality of signal terminals 400 of the electrical connector 1 and a second conductive portion 607*a* for mating with the plurality of power terminals 300 of the electrical connector 1. The first conductive portion 605*a* and the second conductive portion 607*a* are located close to an edge of the first circuit board 601. Although the first conductive portion 605*a* is shown as being closer to the edge of the first circuit board 601 than the second conductive portion 607*a*, the present application is not limited thereto. The first circuit board 601 also includes a first corresponding alignment opening 609*a* configured for cooperating with the first locating post 117*a* of the first platform 109*a* of the electrical connector 1. The first corresponding alignment opening 609*a* may be, for example, a through hole through the first circuit board 601 or blind hole (shown as two in FIG. 6A). When the electrical connector 1 is mounted to the first circuit board 601, the first locating post 117*a* cooperates with the first corresponding alignment opening 609*a* so as to enable the electrical connector 1 to be accurately positioned relative to the first circuit board 601. The first circuit board 601 also includes at least one first mounting hole 611*a* configured for aligning with the at least one first threaded hole 107*a* of the electrical connector 1 and allowing the screws 604 to pass therethrough when the electrical connector 1 is mounted to the first circuit board 601.

Similar to the first circuit board 601, the second circuit board 603 includes, on one side, a third conductive portion 605*b* for mating with the plurality of signal terminals 400 of the electrical connector 1 and a fourth conductive portion 607*b* for mating with the plurality of power terminals 300 of the electrical connector 1. The third conductive portion 605*b* and the fourth conductive portion 607*b* are located close to an edge of the second circuit board 603. Although the third conductive portion 605*b* is shown as being closer to the edge of the second circuit board 603 than the fourth conductive portion 607*b*, the present application is not limited thereto. The second circuit board 603 also includes a second corresponding alignment opening 609*b* configured for cooperating with the second locating post 117*b* of the second platform 109*b* of the electrical connector 1. The second corresponding alignment opening 609*b* may be, for example, a through hole through the second circuit board 603 or blind hole (shown as two in FIG. 6A). When the electrical connector 1 is mounted to the second circuit board 603, the second locating post 117*b* cooperates with the second corresponding alignment opening 609*b* to enable that the electrical connector 1 to be accurately positioned relative to the second circuit board 603. The second circuit board 603 also includes at least one second mounting hole 611*b* configured for aligning with the at least one second threaded hole 107*b* of the electrical connector 1 and allowing the screws 604 to pass therethrough when the electrical connector 1 is mounted to the second circuit board 603. As shown, the at least one first mounting hole 611*a* and the at least one second mounting hole 611*b* are unthreaded.

Continuing with FIGS. 6B and 6C, the first circuit board 601 and the second circuit board 603 are turned up and down, relative to the orientation shown in FIG. 6A, in FIGS. 6B and 6C for assembly. When assembled, the electrical connector 1 is disposed on the side of the first circuit board 601 and the second circuit board 603 including the conductive portions, as shown in FIGS. 6B and 6C. The first locating post 117*a* cooperates with the first corresponding alignment opening 609*a* so as to enable the electrical connector 1 to be accurately positioned relative to the first circuit board 601, and the second locating post 117*b* cooperates with the second corresponding alignment opening 609*b* so as to enable the electrical connector 1 to be accurately positioned relative to the second circuit board 603. The screws 604 are then screwed into the first threaded holes 107*a* and the second threaded holes 107*b* of the electrical connector 1 from the other side of the first circuit board 601 and the second circuit board 603 through the first mounting holes 611*a* and the second mounting holes 611*b*, so as to hold the first circuit board 601 and the second circuit board 603 fixed relative to each other in an edge-to-edge manner. The fourth surface 203 of the housing 200 of the electrical connector 1 faces the first circuit board 601 and the second circuit board 603 and is located close to the first circuit board 601 and the second circuit board 603. The first contact finger 405*a* of each of the plurality of signal terminals 400 extends at least partially beyond the fourth surface 203 of the housing 200 and is pressed against the first conductive portion 605*a* of the first circuit board 601, and the second contact finger 405*b* of each of the plurality of signal terminals 400 extends at least partially beyond the fourth surface 203 of the housing 200 and is pressed against the third conductive portion 605*b* of the second circuit board 603, thereby establishing signal transmission between the first circuit board 601 and the second circuit board 603. The plurality of first contact fingers 303*a* of each of the power terminals 300 extend at least partially beyond the fourth surface 203 of the housing 200 and are pressed against the second conductive portion 607*a* of the first circuit board 601, and the plurality of second contact fingers 303*b* of each of the power terminal 300 extend at least partially beyond the fourth surface 203 of the housing 200 and are pressed against the fourth conductive portion 607*b* of the second circuit board 603, thereby establishing power transmission between the first circuit board 601 and the second circuit board 603. As such, the electrical connector 1 establishes an electrical interconnection between the first circuit board 601 and the second circuit board 603 through the plurality of conductive terminals. In the above manner, the electrical connector 1 holds the first circuit board 601 and the second circuit board 603 fixed relative to each other in an edge-to-edge manner on one side of the first circuit board 601 and the second circuit board 603, and establishes an electrical interconnection therebetween through the plurality of conductive terminals.

Although the first circuit board 601 and the second circuit board 603 are shown as having the same thickness in FIGS. 6A to 6C, it should be appreciated that since the electrical connector 1 holds the first circuit board 601 and the second circuit board 603 fixed relative to each other in an edge-to-edge manner on only one side of the first circuit board 601 and the second circuit board 603, the first circuit board 601 and the second circuit board 603 may have different thicknesses. That is, the electrical connector 1 is adapted to hold a first and second circuit boards 601, 603 having different thicknesses in an edge-to-edge manner relative to each other on one side of the first and second circuit boards 601, 603 (for example, with the aid of screws of different lengths), and to establish an electrical interconnection therebetween through a plurality of conductive terminals.

It should also be appreciated that the first circuit board 601 and the second circuit board 603 are shown in FIG. 6A as having the first conductive portion 605*a* and the second conductive portion 607*a* on only one side thereof for the purpose of illustrating the present application, and that the first circuit board 601 and the second circuit board 603 may also have conductive portions on the other side thereof.

Figure 7B:
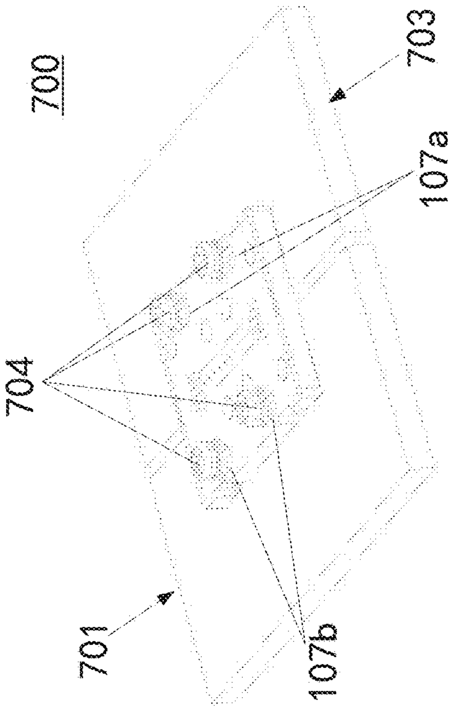
FIG. 7B is a top perspective view of an electronic system having two circuit boards connected by two electrical connectors, according to some embodiments.
Figure 7C:
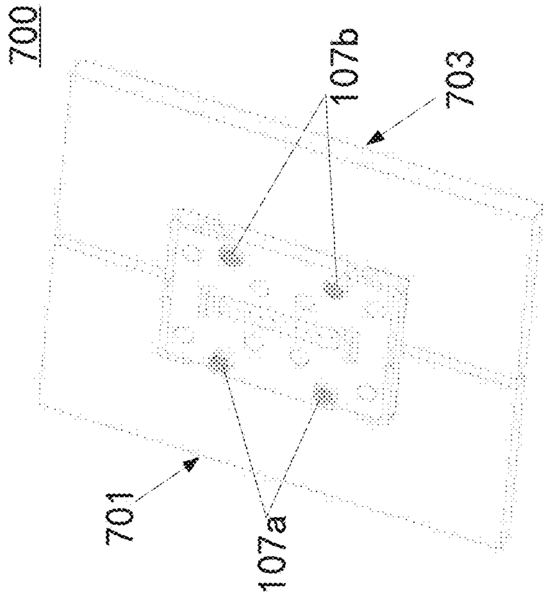
FIG. 7C is a bottom perspective view of the electronic system of FIG. 7B.
Figure 7A:
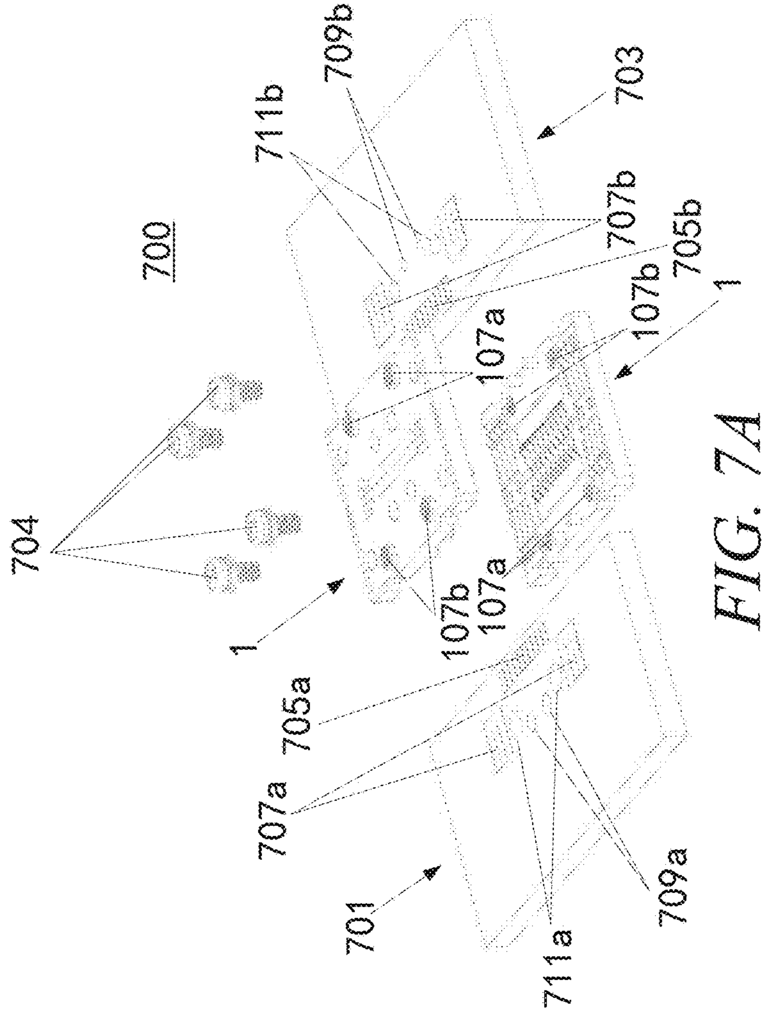
FIG. 7A is an exploded view of the electronic system of FIG. 7B.

FIGS. 7A to 7C illustrate an electronic system 700, which differs from the aforementioned electronic system 600 in that in the electronic system 700, two aforementioned electrical connectors 1 are disposed on each side of a first circuit board 701 and a second circuit board 703, respectively, and cooperate with each other to sandwich the first circuit board 701 and the second circuit board 703 therebetween and to hold first circuit board 701 and second circuit board 703 in place relative to each other in an edge-to-edge manner, so as to establish an electrical interconnection therebetween through a plurality of conductive terminals.

In particular, the electronic system 700 includes a first circuit board 701, a second circuit board 703, two aforementioned electrical connectors 1, and screws 704 for mounting the electrical connectors 1 to the first circuit board 701 and the second circuit board 703. Each of the first circuit board 701 and the second circuit board 703 includes, on each side thereof, a conductive portion for mating with the plurality of signal terminals 400 of the two electrical connectors 1 and a conductive portion for mating with the plurality of power terminals 300 of the electrical connectors 1. The conductive portions on both sides of the first circuit board 701 and the second circuit board 703 (e.g., the conductive portions 705*a*, 707*a*, 705*b*, and 707*b* shown in FIG. 7A on one side of the first circuit board 701 and the second circuit board 703) may have configurations similar to those of the first conductive portion 605*a*, the second conductive portion 607*a*, the third conductive portion 605*b* and the fourth conductive portion 607*b* of the first circuit board 601 and the second circuit board 603, and thus will not be further described. It should be appreciated that similar conductive portions may be provided on the other side of the first circuit board 701 and the second circuit board 703. Furthermore, the corresponding alignment mechanisms and mounting holes of the first circuit board 701 and the second circuit board 703 (e.g., the corresponding alignment mechanisms 709*a* and 709*b* and mounting holes 711*a*, 711*b* shown in FIG. 7A) may have configurations similar to those of the aforementioned first corresponding alignment opening 609*a*, the aforementioned second corresponding alignment opening 609*b*, the aforementioned at least one first mounting holes 611*a* and the aforementioned at least one second mounting hole 611*b* of the first circuit board 601 and the second circuit board 603, and thus will not be further described.

When assembled, as shown in FIG. 7B and FIG. 7C, one of the two electrical connectors 1 is provided on one side of the first circuit board 701 and the second circuit board 703, and the other electrical connector 1 is provided on the other side of the first circuit board 701 and the second circuit board 703. The first locating post 117*a* cooperates with the corresponding alignment mechanisms of the first circuit board 701 and the second circuit board 703 to enable the two electrical connectors 1 to be accurately positioned relative to the first circuit board 701 and the second circuit board 703. The screws 704 are then screwed from the threaded holes of one of the two electrical connectors 1 through the mounting holes of the first circuit board 701 and the second circuit board 703 into the corresponding threaded holes of the other of the electrical connectors 1. In this manner, the two electrical connectors 1 form a "clamp" assembly that sandwiches the first circuit board 701 and the second circuit board 703 therebetween and holds the first circuit board 701 and the second circuit board 703 fixed relative to each other in an edge-to-edge manner.

The fourth surfaces 203 of the housings 200 of both electrical connectors 1 face the first circuit board 701 and the second circuit board 703 and are positioned close to the first circuit board 701 and the second circuit board 703. The plurality of signal terminals 400 of the two electrical connectors 1 establish signal transmission between the first circuit board 701 and the second circuit board 703 on each side of the first circuit board 701 and the second circuit board 703 in a manner similar to that described above with reference to FIGS. 6A to 6C, and the plurality of power terminals 300 of the two electrical connectors 1 establish power transmission between the first circuit board 701 and the second circuit board 703 on each side of the first circuit board 701 and the second circuit board 703 in a manner similar to that described above with reference to FIGS. 6A to 6C. As such, the electrical connector 1 establishes an electrical interconnection between the first circuit board 701 and the second circuit board 703 through the plurality of conductive terminals.

In the manner described above, the two electrical connectors 1 sandwich the first circuit board 701 and the second circuit board 703 therebetween and hold the first circuit board 701 and the second circuit board 703 fixed relative to each other in an edge-to-edge manner, and establish an electrical interconnection between the first circuit board 701 and the second circuit board 703 through the plurality of conductive terminals.

The following configuration of the electrical connector 1 enables the two electrical connectors 1 to be arranged on both sides of the first circuit board 701 and the second circuit board 703 in a manner that the threaded holes are aligned and the edges are aligned: (1) the at least one first threaded hole 107*a* and the at least one second threaded hole 107*b* are arranged symmetrically about the longitudinal center axis 105; and/or (2) the at least one first threaded hole 107*a* is arranged symmetrically about the center plane 115, and the at least one second threaded hole 107*b* is arranged symmetrically about the central plane 115. FIG. 7A illustrates a situation where the at least one first threaded hole 107*a* and the at least one second threaded hole 107*b* are arranged symmetrically about the longitudinal center axis 105, the at least one first threaded hole 107*a* are arranged symmetrically about the center plane 115, and the at least one second threaded hole 107*b* are arranged symmetrically about the center plane 115. However, it should be appreciated that the at least one first threaded hole 107*a* and the at least one second threaded hole 107*b* of the electrical connector 1 may be arranged symmetrically about other axes and/or planes, so as to enable the two electrical connectors 1 to be arranged on both sides of the first circuit board 701 and the second circuit board 703 with the threaded holes aligned.

The electrical connector 1 according to the embodiments of the present disclosure may provide at least one of the following advantages over conventional electrical connectors: (1) a single electrical connector 1 may meet the needs of many applications with different board sizes, which enables a significant reduction in the number of electrical connector models maintained in inventory, thereby reducing logistic costs; (2) it enables the production of the electrical connectors 1 with the same production line and without the need to build multiple production lines or make extensive process adjustments to the same production line, thereby reducing the cost for manufacturing electrical connectors; (3) the electrical connectors 1 enable (a) holding two circuit boards fixed relative to each other in an edge-to-edge manner on one side of two circuit boards with a single electrical connector 1 and establishing an electrical interconnection therebetween through a plurality of conductive terminals, and (b) utilizing two electrical connector 1 with the same configuration to sandwich two circuit boards therebetween and holding the two circuit boards fixed relative to each other in an edge-to-edge manner and establishing an electrical interconnection between the two circuit boards through a plurality of conductive terminals, thereby providing two connecting manners such that the electrical connector can meet the needs of various different applications; (4) a single electrical connector 1 is capable of holding two circuit boards of different thicknesses fixed relative to each other in an edge-to-edge manner on one side of two circuit boards and establishing an electrical interconnection therebetween through a plurality of conductive terminals.

The present disclosure has been described in detail in conjunction with specific embodiments. Obviously, the above description and the embodiments shown in the appended drawings should be understood to be exemplary and do not constitute a limitation on the present disclosure. For a person skilled in the art, various variations or modifications can be made without departing from the spirit of the present disclosure, and these variations or modifications fall within the scope of the present disclosure.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items. The use of terms such as "first", "second", "third" and "fourth" is meant to distinguish an element or component from another element or component, and that these elements and/or components should not be limited by the terms.

What is claimed is:

1. An electrical connector, comprising:

a frame comprising:

- a plate,
- a first platform extending above the plate, the first platform comprising a first end and a second end opposite the first end,
- a second platform extending above the plate, the second platform comprising a third end and a fourth end, opposite the third end, wherein the second platform is substantially parallel to the first platform,
- a first rib extending from the first end of the first platform to the third end of the second platform, and
- a second rib extending from the second end of the first platform to the fourth end of the second platform;

a housing coupled to the frame;

a plurality of conductive terminals held by the housing and between the first rib and the second rib of the frame; and first and second power terminals held by the housing and separated by the plurality of conductive terminals and the first rib and the second rib of the frame.

2. The electrical connector of claim 1, wherein:

the first platform comprises a first threaded hole adjacent to the first end and a second threaded hole adjacent to the second end, and the second platform comprises a third threaded hole adjacent to the third end and a fourth threaded hole adjacent to the fourth end.

3. The electrical connector of claim 2, wherein:

the first platform comprises one or more first locating posts between the first and second threaded holes, and the second platform comprises one or more second locating posts between the third and fourth threaded holes.

4. The electrical connector of claim 1, wherein:

the plate of the frame comprises a first surface and a second surface opposite to the first surface, the first and second platforms extend above the first surface of the plate by a first height, the first and second ribs extend above the first surface of the plate by a second height, and the second height is less than the first height.

5. The electrical connector of claim 1, wherein:

the housing is I-shaped and comprises two lateral portions and a longitudinal portion connecting the two lateral portions, and the longitudinal portion of the housing is disposed between the first and second platforms of the frame.

6. The electrical connector of claim 5, wherein:

the longitudinal portion of the housing comprises a top surface that is substantially flush with top surfaces of the first and second platforms of the frame.

7. The electrical connector of claim 5, wherein:

the two lateral portions of the housing each comprises a chamber; and the first and second power terminals are each disposed in a respective chamber of the chambers of the two lateral portions.

8. The electrical connector of claim 5, wherein:

each of the plurality of conductive terminals is T-shaped and comprises a base, a first straight portion and a second straight portion cantilevered in opposite directions from the base, a first contact finger extending from the first straight portion and a second contact finger extending from the second straight portion.

9. The electrical connector of claim 8, wherein:

the longitudinal portion of the housing comprises a plurality of slots spaced apart from each other, each of the plurality of slots of the housing is T-shaped and comprises a vertical slot section recessed into the housing, and a first lateral slot section and a second lateral slot section each recessed into the housing and opening into the vertical slot section, and each of the plurality of slots of the housing holds one of the plurality of conductive terminals such that the first contact finger and the second contact finger of a respective conductive terminal extend at least partially beyond a top surface of the longitudinal portion of the housing.

10. An electrical connector, comprising:

a frame comprising a plate, a first platform extending above the plate, a second platform extending above the plate and substantially parallel to the first platform, a first plurality of threaded holes through the first platform and a second plurality of threaded holes through the second platform;

an I-shaped housing coupled to the frame and comprising two lateral portions and a longitudinal portion connecting the two lateral portions;

a plurality of conductive terminals held by the longitudinal portion of the housing; and first and second power terminals held by the two lateral portions of the housing, respectively.

11. The electrical connector of claim 10, wherein:

each of the plurality of conductive terminals comprises a base, a first contact finger and a second contact finger cantilevered and extending in substantially opposite directions from the base, and the bases of the plurality of conductive terminals are aligned along a longitudinal axis.

12. The electrical connector of claim 10, wherein:

the longitudinal portion of the housing comprises a bar-shaped protrusion, and the plate of the frame comprises a groove for receiving the bar-shaped protrusion of the longitudinal portion of the housing.

13. The electrical connector of claim 11, wherein:

each of the first and second power terminals comprises a planar base, a plurality of first contact fingers cantilevered and extending from the base in a first direction, and a plurality of second contact fingers cantilevered and extending from the base in a second direction substantially opposite to the first direction, and the bases of the first and second power terminals are aligned along the longitudinal axis.

14. The electrical connector of claim 10, wherein the frame is made of a metallic material so as to provide shielding to the electrical connector.

15. The electrical connector of claim 14, wherein the frame comprises a first rib extending above the plate and substantially perpendicularly to the first platform so as to provide shielding between the plurality of conductive terminals and the first power terminal, and a second rib extending above the plate and substantially parallel to the first rib so as to provide shielding between the plurality of conductive terminals and the second power terminal.

16. An electronic system, comprising:

a first circuit board comprising a first side, a second side opposite the first side, and a first edge connecting the first and second sides, the first side comprising a first row of conductive pads along the first edge;

a second circuit board comprising a third side, a fourth side opposite the third side, and a second edge connecting the third and fourth sides, the third side comprising a second row of conductive pads along the second edge;

a first electrical connector comprising:

a frame comprising a plate, a first platform extending above the plate, a second platform extending above the plate and in parallel to the first platform, a housing coupled to the frame and comprising two lateral portions and a longitudinal portion connecting the two lateral portions, and a plurality of conductive terminals held by the longitudinal portion of the housing, the plurality of conductive terminals each comprising a base, a first contact portion and a second contact portion on opposite sides of the base; and a plurality of screws comprising a first plurality of screws and a second plurality of screws, the first plurality of screws extending through the first circuit board and into threaded holes in the first platform, the second plurality of screws extending through the second printed circuit board and into threaded holes in the second platform, such that the first contact portions of the plurality of conductive terminals are electrically connected to the first row of conductive pads of the first circuit board and the second contact portions of the plurality of conductive terminals are electrically connected to the second row of conductive pads of the second circuit board.

17. The electronic system of claim 16, wherein:

heads of the plurality of screws are on the second side of the first circuit board or the fourth side of the second circuit board.

18. The electronic system of claim 16, wherein the first circuit board and the second circuit board have different thicknesses.

19. The electronic system of claim 16, wherein:

the bases of the plurality of conductive terminals are aligned along a longitudinal line, and the plurality of screws are disposed symmetrically with respect to the longitudinal line.

20. The electronic system of claim 16, wherein:

the second side of the first circuit board comprises a third row of conductive pads along the first edge, the fourth side of the second circuit board comprises a fourth row of conductive pads along the second edge, the electronic system comprises a second electrical connector constructed the same as the first electrical connector, and the plurality of screws hold the second electrical connector to the first circuit board and the second circuit board such that the first contact portions of the plurality of conductive terminal of the second electrical connector electrically connected to the third row of conductive pads of the first circuit board and the second contact portions of the plurality of conductive terminal of the second electrical connector electrically connected to the fourth row of conductive pads of the second circuit board.

* * * * *